United States Patent
Schmidt

(10) Patent No.: US 6,822,207 B2
(45) Date of Patent: Nov. 23, 2004

(54) CONTINUOUS PRODUCT CONVEYOR HAVING A BRICK BAKING HEARTH

(76) Inventor: Richard F. Schmidt, 14 Jerome Ave., Newton, MA (US) 02465

( * ) Notice: Subject to any disclaimer, the term of this patent is extended or adjusted under 35 U.S.C. 154(b) by 0 days.

(21) Appl. No.: 10/413,169

(22) Filed: Apr. 14, 2003

(65) Prior Publication Data

US 2003/0196346 A1 Oct. 23, 2003

Related U.S. Application Data

(60) Provisional application No. 60/373,880, filed on Apr. 19, 2002.

(51) Int. Cl.$^7$ ................................................ H05B 6/78
(52) U.S. Cl. ....................... 219/700; 219/678; 219/656; 198/804
(58) Field of Search .................................. 219/388, 647, 219/653, 656, 698, 700, 701; 198/618, 632, 804

(56) References Cited

U.S. PATENT DOCUMENTS

| | | | |
|---|---|---|---|
| 4,108,138 A | 8/1978 | Petin et al. ................ 126/19 R |
| 4,215,266 A | 7/1980 | Smith et al. ................ 219/413 |
| 4,245,613 A * | 1/1981 | Wells et al. ............... 126/19 R |
| 4,687,895 A * | 8/1987 | Chitre et al. ................ 219/701 |
| 4,739,154 A | 4/1988 | Bharara et al. ............. 219/388 |
| 4,757,184 A | 7/1988 | Swanson et al. ............ 219/400 |
| 5,021,635 A | 6/1991 | Willett ........................ 219/408 |
| 5,119,719 A | 6/1992 | DePasquale ................. 99/339 |
| 5,149,556 A * | 9/1992 | Le Viet et al. .............. 426/521 |
| 5,605,092 A | 2/1997 | Riccio ......................... 99/401 |
| 5,686,004 A | 11/1997 | Schneider .................... 219/388 |
| 5,692,597 A | 12/1997 | Ferguson ..................... 198/841 |
| 5,881,636 A | 3/1999 | Sweet et al. .............. 99/443 C |
| 6,041,769 A | 3/2000 | Llodra, Jr. et al. ........ 126/41 R |
| 6,157,002 A | 12/2000 | Schjerven, Sr. et al. .... 219/388 |
| 6,189,686 B1 | 2/2001 | Shibayama et al. ......... 198/853 |
| 6,245,370 B1 | 6/2001 | Pilati et al. ................ 426/289 |
| 6,320,165 B1 | 11/2001 | Ovadia ........................ 219/400 |
| 6,321,895 B1 | 11/2001 | Kilby et al. ............... 198/85 L |

FOREIGN PATENT DOCUMENTS

WO    WO 88/01719    3/1988

* cited by examiner

Primary Examiner—Thor Campbell
(74) Attorney, Agent, or Firm—Choate, Hall & Stewart

(57) ABSTRACT

A method and apparatus for merging the processes of hearth baking and conveyor baking to offer the benefits of the two processes while eliminating many of the shortcomings. In one aspect, the present invention is a horizontal food-grade product conveyor to transport and support food substances within or through a cooking chamber in a continuous motion. The product conveyor comprises a frame, a support structure, a drive mechanism, and rotating segments of ceramic, brick, firebrick, stone, baked clay, transite, quarry tile, or other non-metallic material which form an endless baking hearth. Each hearth segment interacts with the next adjacent hearth segment to facilitate turning around a radius while forming and maintaining a continuous, flat product support surface and preheated baking hearth. The continuous flat hearth formed by the segments allows transportation and baking of the food substances in one direction while permitting temperature recovery of the segments during the return travel underneath the formed baking hearth.

31 Claims, 17 Drawing Sheets

CONTINUOUS PRODUCT CONVEYOR HAVING A BRICK BAKING HEARTH

CROSS-REFERENCE TO RELATED APPLICATIONS

The present application claims priority to U.S. Provisional Application Ser. No. 60/373,880, filed Apr. 19, 2002, the teachings of which are incorporated herein by reference.

FIELD OF THE INVENTION

The present invention is directed to the field of baking equipment and processes and more specifically to an apparatus and method for a continuous product conveyor having a brick-like baking hearth.

BACKGROUND OF THE INVENTION

A number of oven technologies are known for the production of food substances including pizza, flat breads, traditional breads, and the like. These technologies include common deck ovens, brick ovens, and conveyor ovens, as described below.

Common Deck Ovens

Common deck ovens are predominantly utilized by start-up and low volume independent operations producing food substances with limited resources. This is primarily due to the common deck oven's lower cost when compared to alternative brick ovens and conveyor ovens. Common deck ovens employ thermostatically controlled cooking chambers of various sizes and dimensions that have interior walls and baking surfaces of various types of metal. Most commonly, these ovens employ a primary heating means of electricity, natural gas, or propane. Baking food substances in a common deck oven usually includes placing the food substance on a heavy pan or similar device. This is necessary because the placement of food substances directly on the metal floor of the cooking chamber can cause sticking, burning, and uneven cooking due to the floor's metal construction and uneven heat distribution. The baking pan is usually lined with oil that serves to reduce the probability of sticking and to promote browning. The use of a pan also allows the food substance to be easily placed in, manipulated within, and removed from the cooking chamber. The process of pan cooking is generally considered to produce a less crispy, doughy and sometimes soggy crust or product when compared to hearth baking. These beliefs are well-founded as a pan serves as a barrier which hinders the release of steam and moisture during the baking process. The introduction of oil to the pan further inhibits the purging of this moisture and saturates the crust.

In an attempt to produce a more crisp crust from a pan, the prior art has reported removing food substances from the pan near the end of the baking process and placing them directly on the cooking chamber's metal floor in an attempt to quickly crisp the bottom of the crust via a short period of direct high heat transfer. However, due to the presence of oil in the pan, this practice can result in a slightly foul or sour taste/smell as the oil present in the bottom of the crust can deteriorate when exposed directly to the hot oven floor, thereby imparting the undesirable taste. To obtain a crisp crust on its pan pizza, one national pizza chain places an excessive amount of oil in the pan prior to placing the dough in it. This practice can produce a more crisp crust by causing the bottom portion to fry in the oil during the cooking process, but results in a high fat product.

Pans with holes, screens and similar devices ("screens") which serve to support food substances expose a greater portion of the food substance to the ambient heat of the oven and allow excess moisture to escape during the baking process thereby enhancing crispness. Employing screens can produce a somewhat effective result when utilized in a faster baking, evenly heated convection oven. However, they produce mixed results when used in conjunction with common deck ovens, as they fail to remedy the inherent uneven heat distribution throughout the oven's floor. Furthermore the sticking of food substances to such screens is a problem as penetration of the apertures of the screens can result before baking occurs.

Production personnel, bakers, operators of restaurants and production equipment, and individuals familiar with the art ("bakers") who utilize common deck ovens report that the task of producing a consistent product is labor intensive and requires significant training as optimum baking time varies with fluctuating temperatures within the cooking chamber. These fluctuations are the result of bakers repeatedly opening the door to shift food substances cooking on pans or screens to other areas of the cooking chamber floor in an attempt to compensate for uneven heat distribution. This practice results in inconsistent product quality, decreased energy efficiency, and an uncomfortably hot work environment. Also noted was an increased risk of injury due to the intensive interaction with the oven.

When an operation utilizing a common deck oven experiences increased demand, additional deck ovens can be added beside or stacked on top of the existing oven if space allows. The stacking of ovens is considered by some bakers to be a less preferred option as it involves placing the cooking chamber apertures at levels that may not be at an optimum access height.

For various examples of common deck ovens, see U.S. Pat. No. 5,021,635 to Willett; U.S. Pat. No. 4,757,184 to Swanson et al.; and U.S. Pat. No. 4,215,266 to Smith et al., the teachings of all of which are incorporated herein by reference.

Brick Ovens

"Brick" ovens fall into a number of categories including: (1) common deck ovens enhanced with a supplemental ceramic, brick, firebrick, stone, baked clay, transite, quarry tile, or other non-metallic materials which serve as a baking surface ("hearth") that is placed on the cooking chamber's metal floor and sometimes on racks within the cooking chamber; (2) deck ovens designed and manufactured with an incorporated baking chamber floor of a material which serves as a hearth; and (3) custom-built brick ovens which contain a hearth, walls and ceiling of one or more of the above mentioned materials. Food substances that are baked in direct contact with a hearth may be referred to as "Brick Oven", "New York Style", "Neapolitan", or "Old World" products.

Brick ovens are considered by many bakers to produce a product that is superior to that which can be produced in ovens utilizing a conventional, convection or impingement cooking chamber but lacking a hearth. Most commonly, these ovens employ a primary thermostatically controlled heating means of electricity, natural gas, or propane. In some applications, wood or coal is used. However, temperature within the cooking chamber of a wood or coal fired oven is often difficult to control and preheat times are lengthy. New wood-burning brick ovens, featuring a primary heating means via natural gas, electricity or propane with wood incorporated mainly for its visual appeal, have attempted to remedy this shortcoming.

There are many reasons why a brick oven produces superior baked food substances. Superior quality is generally attributed to the fact that food substances are placed directly on a pre-heated hearth. The hearth also has a tendency to absorb moisture during the baking process due to its porous qualities. Although the food substances are subjected to heat from all sides thereby simultaneously baking from all sides, the most intense and rapid heat transfer takes place from beneath due to the direct contact between the pre-heated hearth and the food substance. This degree of heat transfer can not be achieved in ovens where direct contact with a pre-heated hearth is not possible.

Other technologies that improve heat transfer include hot air convection cooking and forced hot air impingement, which serve to reduce the cold zone that surrounds food substances. These technologies increase the rate at which heat transfer takes place; however, these technologies still fail to achieve the same rapidity of heat transfer that is achieved via the direct contact with a pre-heated hearth.

The rapid heat transfer that takes place between a pre-heated hearth.and food substances results in a reduced bake time and a baking process that effectively causes food substances to bake from the bottom-up. This yields a more crisp, lighter, and puffy crust on baked food substances. Additionally, because any toppings that may be placed on the dough bake more slowly than the crust, there is less opportunity for the toppings to dry out. Liquids contained in toppings also have less opportunity to be absorbed by a slow baking crust which results in a soggy product.

Bakers who utilize brick ovens report the task of baking food substances in brick ovens is far more labor intensive than baking with a common deck oven, as more training is required to achieve satisfactory results than is necessary with the common deck oven. A number of shortcomings were cited which explain the increased difficulty of operation.

One such shortcoming is wide fluctuations in hearth temperature. These fluctuations are caused by the placement of food substances directly on the hearth for baking. When a food substance is placed directly on the hearth, the heat transfer that takes place results in a decrease in the temperature of the hearth. When baking is complete and the food substance is removed, the area of the hearth on which baking occurred must be given time to recover its lost energy and return to optimum baking temperature before another food substance can be placed on the same area and baked with a similar result. This is known as recovery time. This recovery process also serves to purge the hearth of moisture that was absorbed during the baking process. In high volume operations, bakers report difficulty remembering which areas of the hearth are in the process of recovery and which areas have recovered to optimum baking temperature. When multiple bakers are involved in production, this process becomes extremely difficult.

Because the food substances are commonly placed directly on the hearth to achieve rapid heat transfer, there are seldom pans, screens and similar devices utilized in the baking process. Without the use of pans and screens, bakers face additional challenges operating a brick oven. For preparing food substances prior to placement in a brick oven, a baker's peel or similar device is used. A peel is often made of a material that allows food substances to easily slide across its surface when dusted with flour, corn meal or similar substances. Food substances are slid off of the peel and directly onto the preheated hearth. A similar device is used to free food substances from the hearth and remove them from the oven when baking is complete. Upon removal, an oven broom or similar device is used to sweep flours, corn meals and other residuals from the baking process off of the hearth in preparation for the placement of another food substance. These are time consuming and highly labor intensive processes. Furthermore, due to the lack of leverage afforded by such devices and the dimensions of deep cooking chambers, these devices are usually of considerable length and difficult to manipulate in smaller kitchens. These tasks become more tedious when numerous food substances occupy the cooking chamber(s) at the same time and numerous bakers are involved in the production process.

Brick ovens also share the commonly reported shortfall of common deck ovens which is the necessity of having to open the door to the baking chamber repeatedly to check food substances baking on the hearth. Due to the rapid transfer of heat from the hearth to food substances as well as varying hearth and ambient air temperatures within the cooking chamber, bakers must make regular observations to ensure a quality product. This is especially prevalent in high volume operations that utilize brick ovens with multiple bakers involved in the baking process at the same time. Furthermore, the increased frequency of opening the oven door results in greater temperature fluctuations within the cooking chamber. The result of this extensive interaction is inconsistent product quality, decreased energy efficiency, and an uncomfortable, hot work environment. Increased risk of injury also results from the intensive interaction with the oven. Because the process of checking for doneness of food substances is repeated so often, some brick oven manufacturers have eliminated the oven door. Bakers claim the risk of burns is further increased by the lack of a door due to the direct exposure to the interior cooking chamber while energy efficiency is decreased.

When an operation utilizing a brick oven expands its customer base and experiences increased demand, additional ovens can be added beside or stacked on top of the existing oven if space allows. The stacking of ovens is considered by some bakers to be a less-preferred option as it involves placing the cooking chamber apertures at levels that may not be an optimum access height.

For various examples of brick ovens, see U.S. Pat. No. 6,041,769 to Llodra, Jr. et al; U.S. Pat. No. 5,605,092 to Riccio; U.S. Pat. No. 5,119,719 to DePasquale; and U.S. Pat. No. 4,108,138 to Petin et al., the teachings of all of which are incorporated herein by reference.

Conveyor Ovens

Conveyor ovens are predominantly utilized by higher volume operations which may have had access to greater financial resources when operations were initiated or realized increasing volumes and profitability over time that warranted the increased capital investment that is required to obtain this technology. Conveyor ovens have become the standard production equipment for many commercial bakeries and national food service chains producing food substances such as pizza, flat breads, traditional breads and the like. The conveyor oven's popularity can be attributed to the fact that it offers increased production volume, consistency, efficiency, safety, and ease of use/operation when compared to other ovens. Bakers utilizing conveyor ovens report the task of producing food substances is significantly less labor intensive, more efficient and requires less training of bakers to achieve consistency. This is due to the conveyor oven's high degree of automation.

Conveyor ovens employ cooking chambers of various sizes that commonly have interior walls of various types of metal. The size of cooking chambers is often dependent on the designed production capacity as well as the types of food substances to be baked. Horizontal food-grade product conveyors of varying lengths, widths and open areas commonly transport food substances to be baked into, through, and out of the cooking chamber in a continuous motion. These conveyors extend varying lengths from the cooking chamber's entry and exit apertures to facilitate the loading and unloading of food substances though sometimes they may be fully contained within the cooking chamber. The dimensions of such product conveyors are governed by the dimensions of the cooking chamber and the cooking chamber apertures. Conveyor ovens most commonly employ a primary heating means of electricity, natural gas or propane.

Conveyor ovens offer superior consistency when compared to common deck ovens and brick ovens. The speed at which the product conveyor transports food substances through the cooking chamber is usually adjustable and can be measured in terms of conveyor feet traveled per minute. This allows for precise adjustment of the time food substances undergo the baking process. For example, a conveyor oven employing a baking chamber of 36" in length with the conveyor speed of one-half of one foot per minute would result in consistent exposure to the baking chamber of exactly six minutes. This results in greater consistency as the baking time in the cooking chamber is not subject to human error. Conveyor oven cooking chambers also maintain more consistent temperatures as they are not subject to dramatic fluctuations caused by the excessive opening and closing of large access doors. Cooking chamber entry and exit apertures are commonly set just large enough to accommodate the food substance. With the incorporation of convection and forced hot air impingement technologies, today's conveyor ovens efficiently reduce the thin layer of cooler air known as the "cold zone" that surrounds foodstuffs in the baking chamber. By reducing the cold zone with convection and impingement technologies, the rate at which heat transfer takes place is improved. When these convection and impingement technologies are combined with a product conveyor that maintains food substances in a continuous state of movement as it transports them through the cooking chamber, inconsistent heat distribution and heat transfer to the food substance are reduced.

Baking food substances in a conveyor oven almost always incorporates the use of pans, screens, and similar devices. This is necessary due to the fact that the food substances are carried through the cooking chamber on a conveyor with varying degrees of open areas. Due to the risk of food substances penetrating the open area of the conveyor which could result in mechanical failure they are seldom or never placed directly on the conveyor. The open area of the conveyor serves to increase the food substances' exposure to the ambient air and/or infrared heat within the cooking chamber thereby improving heat transfer. The utilization of screens instead of solid pans also allows moisture to be purged from the food substance during the baking process. While this is an improvement over common deck ovens, the rapid heat transfer that takes place between a brick oven's hearth and a food substance can not be matched. Furthermore, hot air convection and impingement technology has been known to evaporate too much moisture from food substances. As a result, conveyor ovens not only fail to produce the lighter, more crisp and puffy crust that hearth baking is known for but also can produce an excessively dry product.

The latest ovens lacking a product conveyor can not match the level of consistency inherent in a conveyor oven. Timers capable of tracking the exposure of numerous food substances in an oven at once have been installed as standard equipment on various production equipment lacking a product conveyor in an attempt to assist bakers with product consistency. They have also been produced as supplemental systems to be used with equipment lacking timers. In practice, these timers have generally not produced substantial gains in consistency primarily due to human error caused by multiple bakers operating the same ovens at once. During peak production periods, these timers are often turned off by bakers as they are seen as an annoyance. Ironically, while these devices were designed to improve consistency during peak hours when quality control is most difficult to maintain, they are often utilized exclusively during off-peak hours when bakers are involved in other tasks and are more likely to forget about food substances placed in the oven.

When an operation utilizing a conveyor oven expands its customer base and experiences increased demand, additional conveyor ovens can be added beside or stacked on top of the existing oven if space allows. In the case of conveyor ovens, stacking is generally preferred even though this results in a less than optimum access height. Most bakers who utilize conveyor ovens had previously utilized other types of ovens. Bakers who had utilized common deck ovens commented on the increases in consistency, efficiency, and safety offered by conveyor ovens. Bakers who had utilized brick ovens also commented on increases in consistency, efficiency and safety. However, the vast majority of bakers mentioned that while the conversion to a conveyor oven achieves the mentioned benefits, product quality is sacrificed.

For various examples of conveyor ovens, see U.S. Pat. No. 6,157,002 to Schjerven, Sr. et al; U.S. Pat. No. 5,686,004 to Schneider; U.S. Pat. No. 5,881,636 to Sweet et al.; and U.S. Pat. No. 4,739,154 to Bharara et al., the teachings of all of which are incorporated herein by reference.

There is therefore a need for an oven having the speed, efficiency and consistency of a conveyor oven yet able to provide the quality and appeal of a product cooked by a hearth baking process.

SUMMARY OF THE INVENTION

A method and apparatus is disclosed for merging the processes of hearth baking and conveyor baking to offer the benefits of the two processes while eliminating many of the shortcomings. In one aspect, the present invention is a horizontal food-grade product conveyor to transport and support food substances within or through a cooking chamber in a continuous motion. The product conveyor assembly comprises a conveyor frame, a support structure, a drive mechanism, and rotatable segments of ceramic, brick, firebrick, stone, baked clay, transite, quarry tile, or other non-metallic material which form an endless baking hearth. Each hearth segment interacts with the next adjacent hearth segment to facilitate turning around a radius while forming and maintaining a continuous, flat product support surface and preheated baking hearth. The continuous flat hearth formed by the segments allows transportation and baking of the food substances in one direction while permitting temperature recovery of the segments during the return travel underneath the formed baking hearth.

BRIEF DESCRIPTION OF THE DRAWING

The invention is described with reference to the several figures of the drawing, in which.

DETAILED DESCRIPTION OF THE PREFERRED EMBODIMENTS

Figure 1:
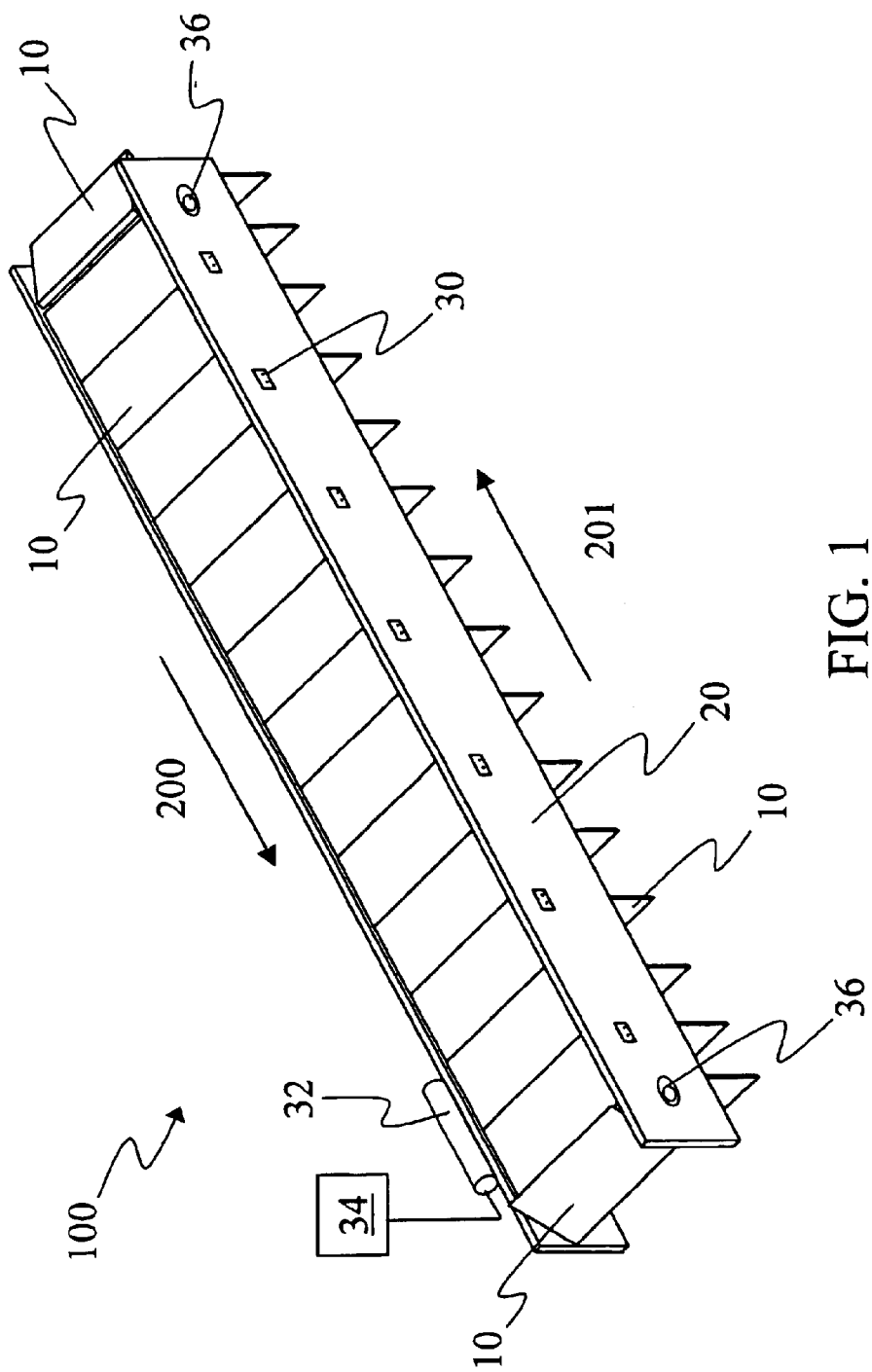
FIG. 1 is a perspective view of the a continuous conveyor hearth baking assembly according to one embodiment of the invention.

The present invention provides an oven system that combines the advantages of a conveyor baking oven, including increased consistency, efficiency, safety and ease of operation, with the superior quality and appeal of a brick oven hearth baking process. In one embodiment, the invention is a horizontal food-grade product conveyor of varying lengths and widths to transport and support food substances within or through a cooking chamber in a continuous motion. The conveyor may extend by varying lengths from a cooking chamber's entry and exit apertures to facilitate the loading and unloading of food substances or it may fully reside within the cooking chamber. The product conveyor assembly comprises a conveyor frame, support structure, and rotatable segments of hearth material which serve to form an endless baking hearth "belt". Each hearth segment interacts with the next adjacent hearth segment to facilitate turning around a radius while forming and maintaining a continuous flat product support surface. Food substances are placed on the flat, smooth, and continuously-formed hearth and are transported and baked on the hearth segments. The hearth segments then experience temperature recovery during the return travel underneath the formed baking hearth and are therefore pre-heated in preparation for the transport and baking of another food substance.

Referring now to the figures of the drawing, the figures constitute a part of this specification and illustrate exemplary embodiments of the invention. It is to be understood that in some instances various aspects of the invention may be shown exaggerated or enlarged to facilitate an understanding of the invention.

FIG. 1 is a perspective view of a continuous conveyor baking hearth according to one embodiment of the invention. The product conveyor assembly, shown generally with reference numeral 100, comprises rotating hearth segments 10 positioned on a conveyor frame 20, supported by support structure 30, and driven by a drive mechanism, such as drive axle 40. The hearth segments 10 may be made entirely of ceramic, brick, firebrick, stone, baked clay, transite, quarry tile, or other non-metallic material suitable for baking food substances upon or may contain a component thereof upon which food substances are placed in combination with other materials. The hearth segments form an endless hearth for baking. Elements of the support structure 30 may include transverse members providing structural support to the conveyor frame 20 as well as additional axle elements to aid in the cyclic movement of the conveyor assembly. Further shown is a drive motor 32 and controller 34 used to operate and control the drive axle 40. The drive motor 32 is attached to the conveyor frame 20. The directions of motion of the conveyor assembly are shown generally by reference numerals 200 for the direction of motion during a transportation and baking stage of the conveyor cycle and 201 for the direction of motion during a return and reheating stage of the conveyor cycle.

Figure 2:
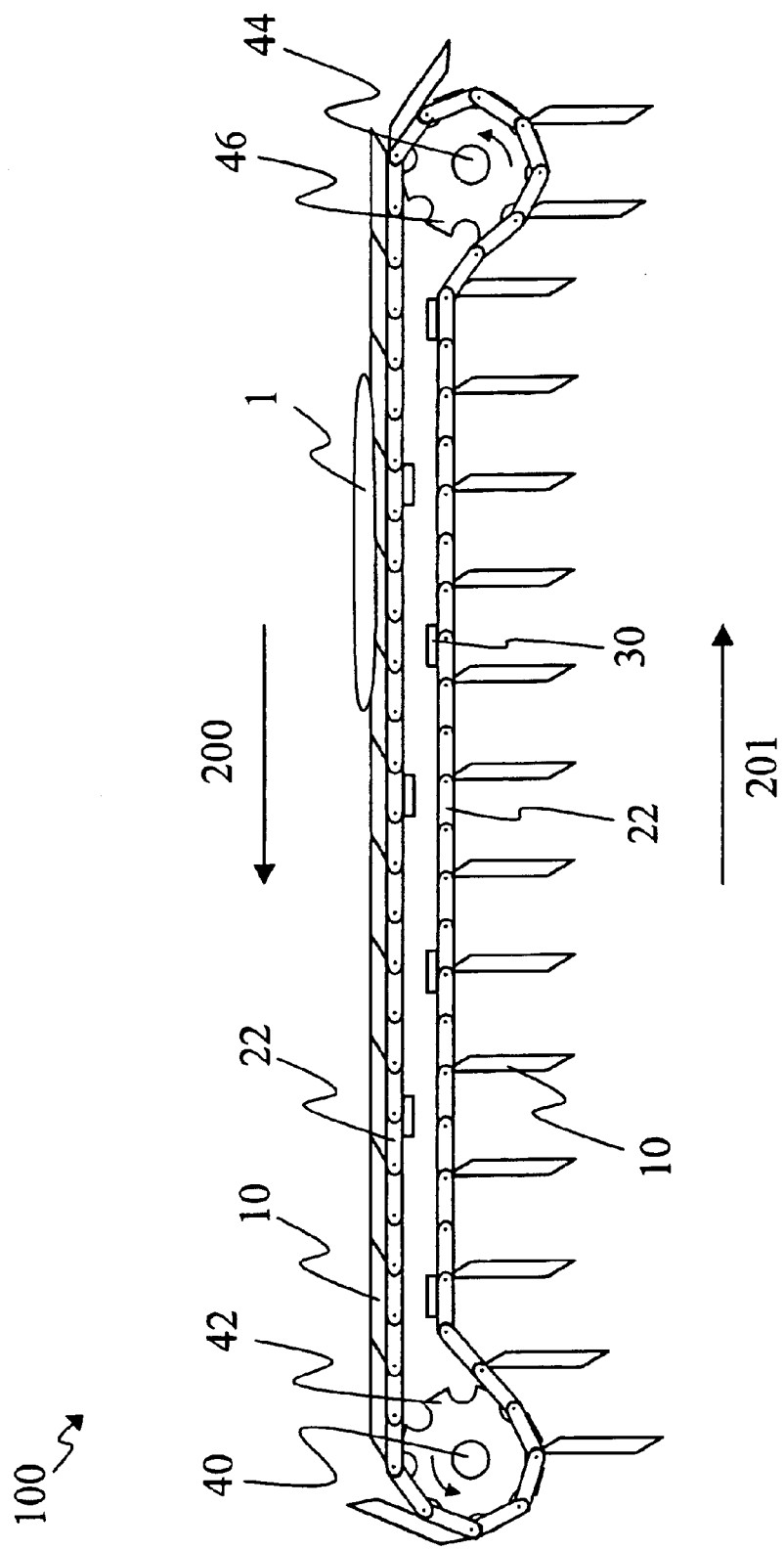
FIG. 2 is a schematic view of the conveyor assembly according to one embodiment of the invention.

FIG. 2 is a schematic view of the conveyor assembly according to one embodiment of the invention. Food substances 1 are placed on available flat hearth segments 10 and baked as they are transported by the product conveyor assembly 100. The drive axle 40 is disposed at the unloading end of the conveyor and an idle axle 44 is disposed at the loading end. In one embodiment, the drive axle 40 and idle axle 44 experience low frictional rotation due to the incorporation of bearings that reside in bearing housings 36. Such bearing housings can be affixed to the conveyor frame 20 (see FIG. 1). The drive axle 40 includes a plurality of drive sprockets 42. During operation, the drive axle 40 and the attached drive sprockets 42 are rotated by the drive motor 32. It will be apparent to those of ordinary skill in the art that the ultimate placement of the drive motor 32 and other drive components will be governed by the design of the oven/baking apparatus utilizing the conveyor assembly. The drive axle 40 and idle axle 44 are arranged substantially parallel to each other. In multiple embodiments, the idle axle 44 may be a smooth wheel or may include a plurality of idle sprockets 46 in which each idle sprocket 46 is aligned with corresponding drive sprockets 42.

Figure 3:
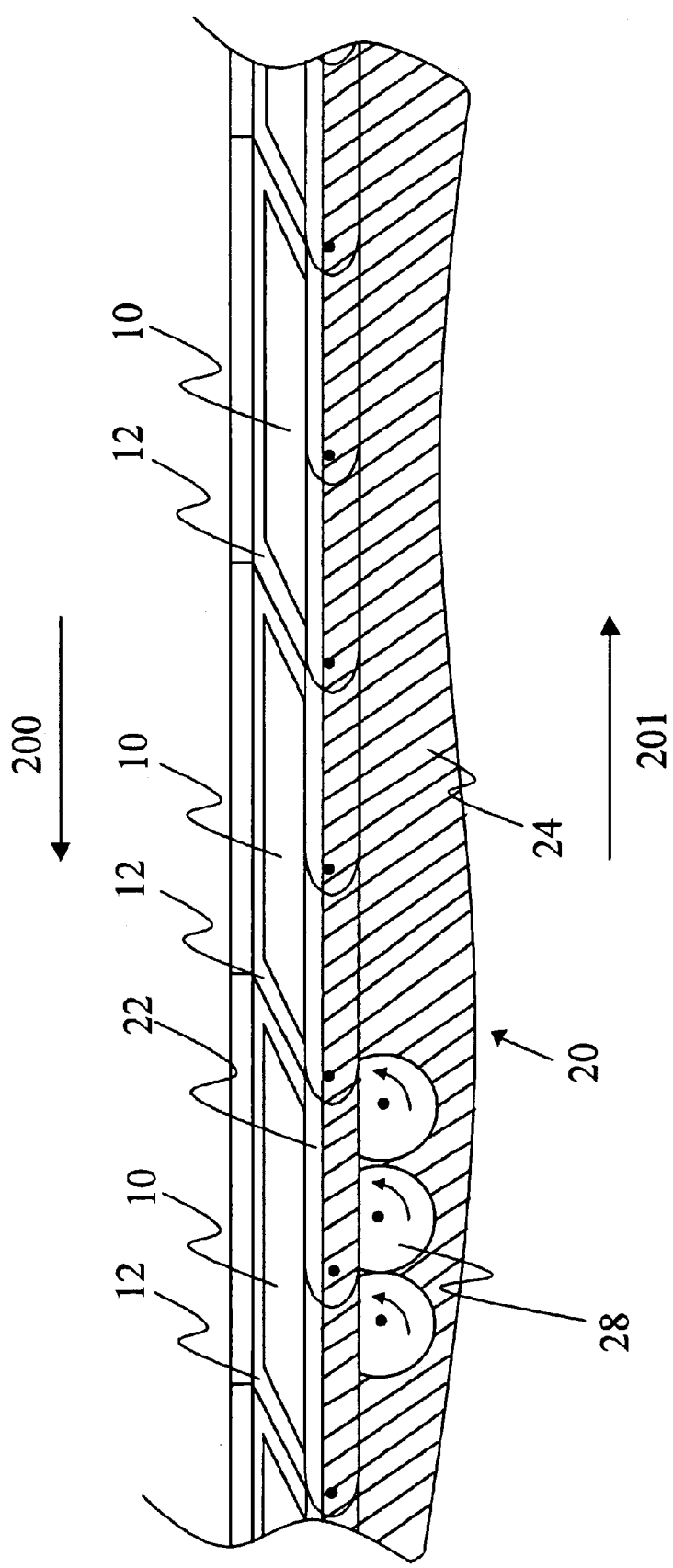
FIG. 3 is an enlarged view of the hearth segments and conveyor frame according to one embodiment of the invention.

FIG. 3 is an enlarged perspective view of hearth segments 10, drive chain 22 and conveyor frame 20. It should be noted that although the hearth segments are shown having the cross section dimensions of a parallelogram in which the longest sides are aligned in a longitudinal direction with the direction of motion, other dimensions and configurations of the hearth segments are possible. For example, the hearth segments may be dimensioned as square or rectangular segments.

In one embodiment, the conveyor frame 20 operates with a drive chain or cable mechanism 22 that is utilized to drive the cyclic motion of the assembly. The conveyor frame 20 further includes longitudinal side rails 24 providing lateral support and one or more rotational support pins, rods, or other mechanisms 26 attached to the hearth segments to provide a rotational axis and gravitational support. The hearth segments 10 are rotatably attached to the rotational support pins 26 which are attached to the drive chain 22. It should be noted that not all rotational support pins attached to the drive chain must provide both a rotational axis and gravitational support as some may provide only gravitational support. These components allow movement of the drive chain or cable 22 with a low coefficient of friction so as to permit smooth operation of the assembly. Additionally, the conveyor frame 20 may include support rollers 28 that are supported by the side rails 24 beneath the hearth segments 10. Such support rollers 28 form a bed upon which the hearth segments may easily travel. The support rollers may also reside on additional idle support axles of support structure 30 which have a low coefficient of friction due to the incorporation of idle bearings residing within idle bearing housings that are affixed to the side rails 24 of the conveyor frame 20.

Figure 4:
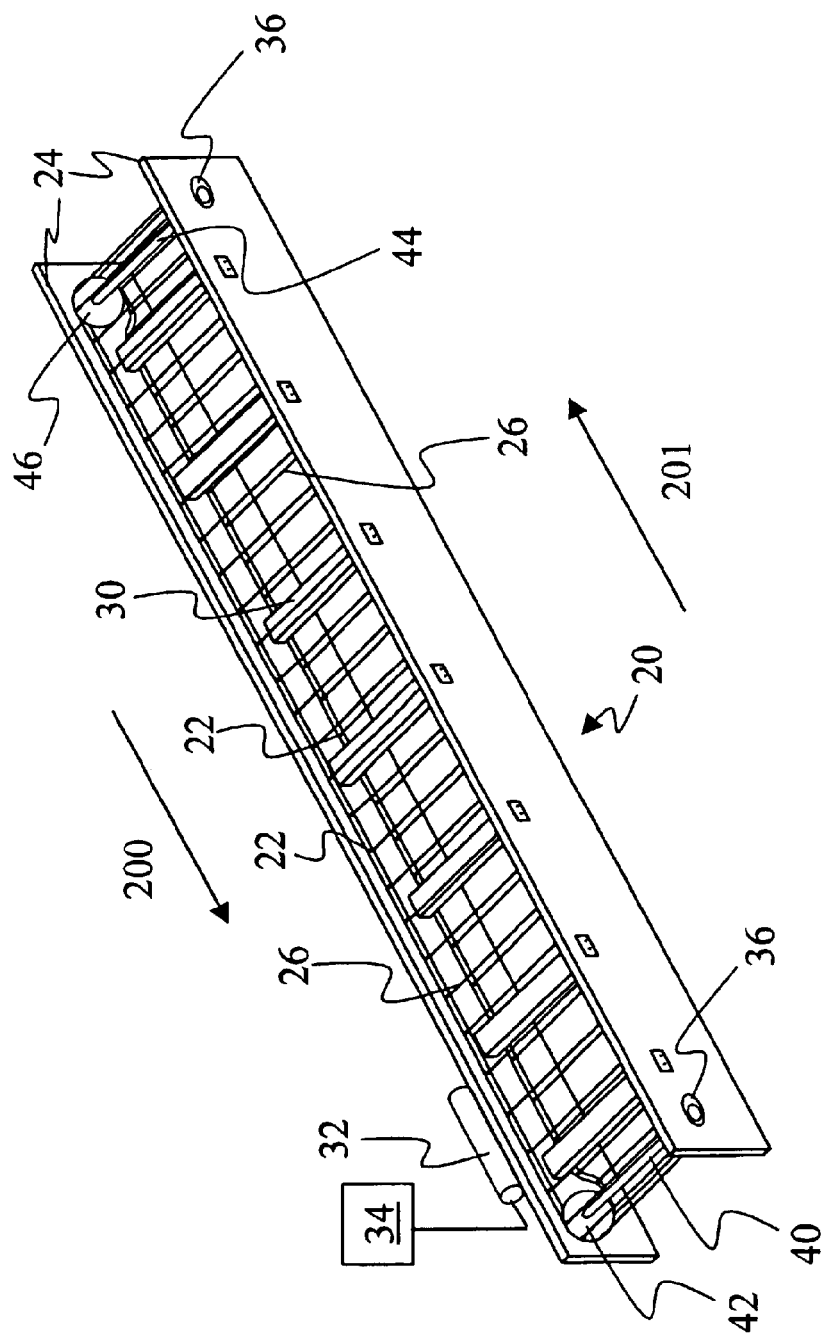
FIG. 4 is a perspective view of the conveyor assembly in which the hearth segments have been removed to show the configuration of the drive chain and conveyor frame according to one embodiment of the invention.

FIG. 4 is a perspective view of the conveyor assembly in which the hearth segments have been removed to show the configuration of the conveyor frame including rotational support pins 26 attached to the drive chain 22, according to one embodiment of the invention. The drive chain 22 may be a cross rod roller chain with cross rods serving as the rotational support pins. In another embodiment, the rotational support pins may be secured to an attachment chain. The drive chain is entrained in the meshing engagement with the drive 42 and idle 46 sprockets residing on the drive 40 and idle 44 axles. The drive chain 22 forms a continuous loop to drive the conveyor assembly in two stages of the conveyor cycle: the transportation and baking stage and the return and reheating stage. The drive chain 22 may be used to both drive the continuous hearth conveyor and provide gravitational support.

Figure 5:
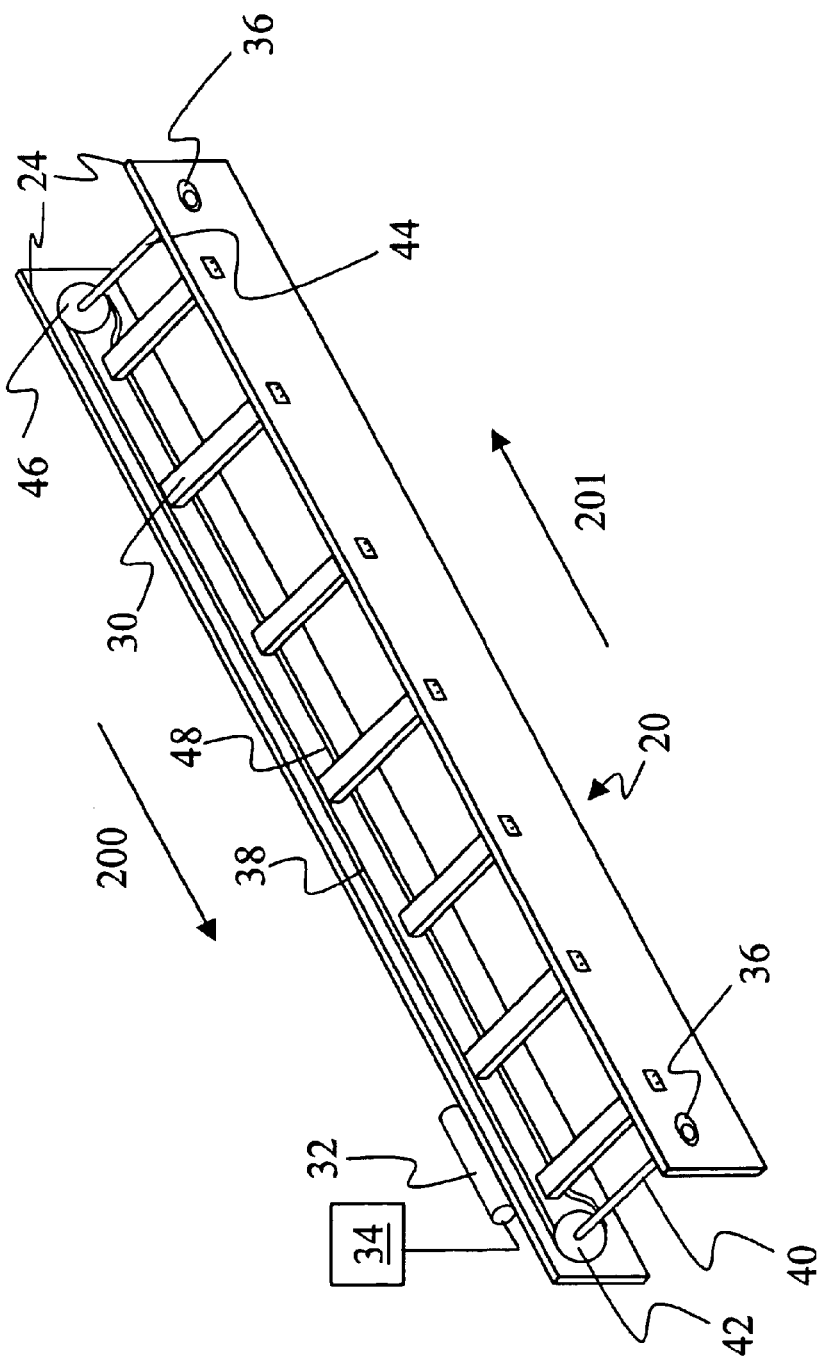
FIG. 5 is a perspective view of the conveyor assembly in which the hearth segments and drive chain have been removed to show the configuration of the conveyor frame according to one embodiment of the invention.

FIG. 5 is a perspective view of the conveyor assembly in which the hearth segments, drive chain and rotational support pins have been removed to show the configuration of the conveyor frame according to one embodiment of the invention. In one embodiment, upper 38 and lower 48 channel guides receive the drive chain and are mounted to the longitudinal side members 24 of the conveyor frame 20. The channel guides 38, 48 also guide the drive chain 22 in a way that provides lateral stability to the drive chain and hearth segments. During operation, the movement of the continuous hearth conveyor assembly is normally driven via the drive sprocket 42 attached to the drive axle 40. The drive motor 32 rotates the drive axle 40 and is controlled by the variable speed controller 34. It will be appreciated by those or ordinary skill in the art that various types of drive and conveyor chains other than cross rod roller chains may be used to place the conveyor assembly in motion.

Figure 6:
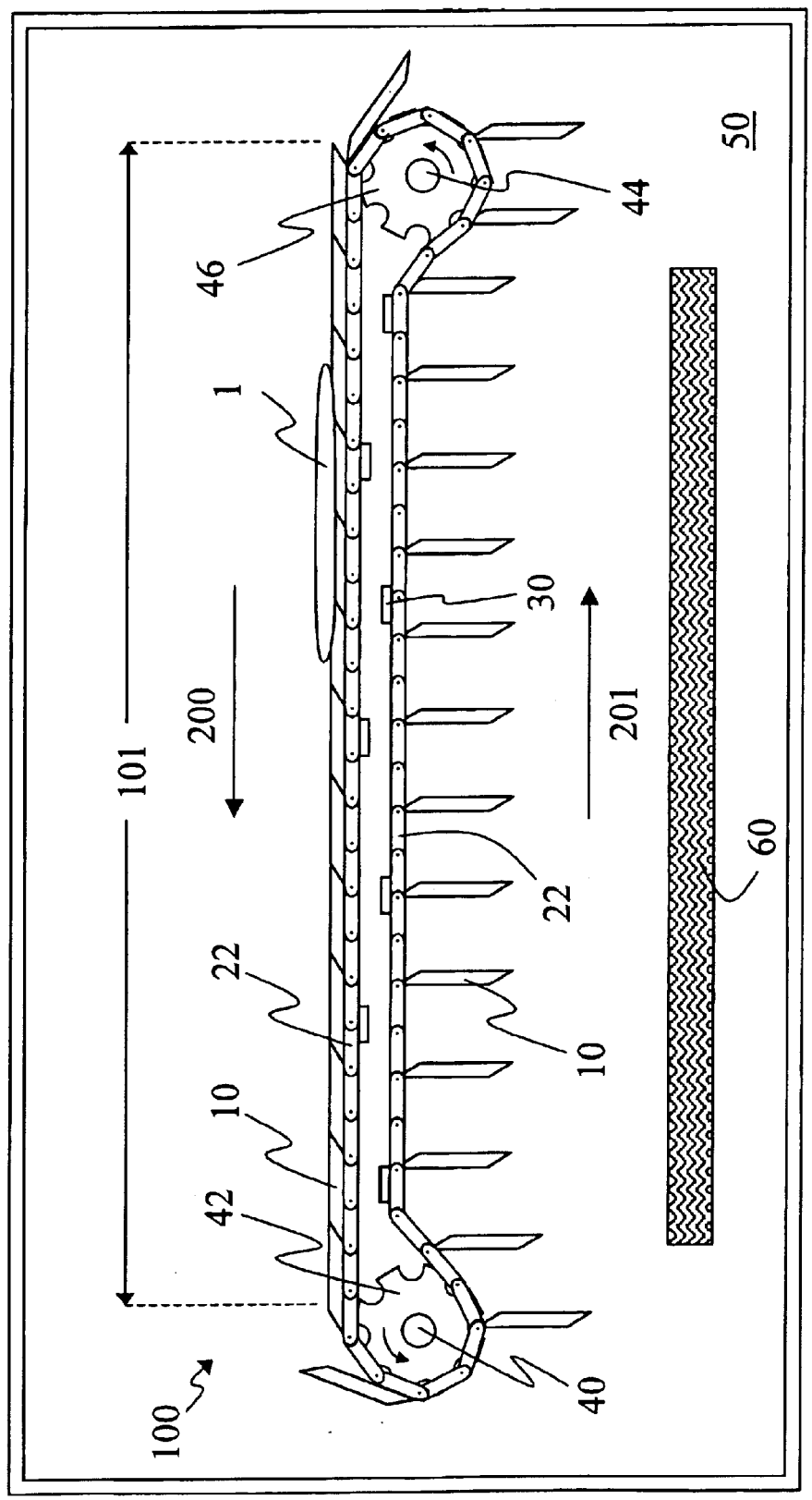
FIG. 6 is a schematic view of the apparatus within a cooking chamber and utilizing a heating mechanism according to one embodiment of the invention.
Figure 8:
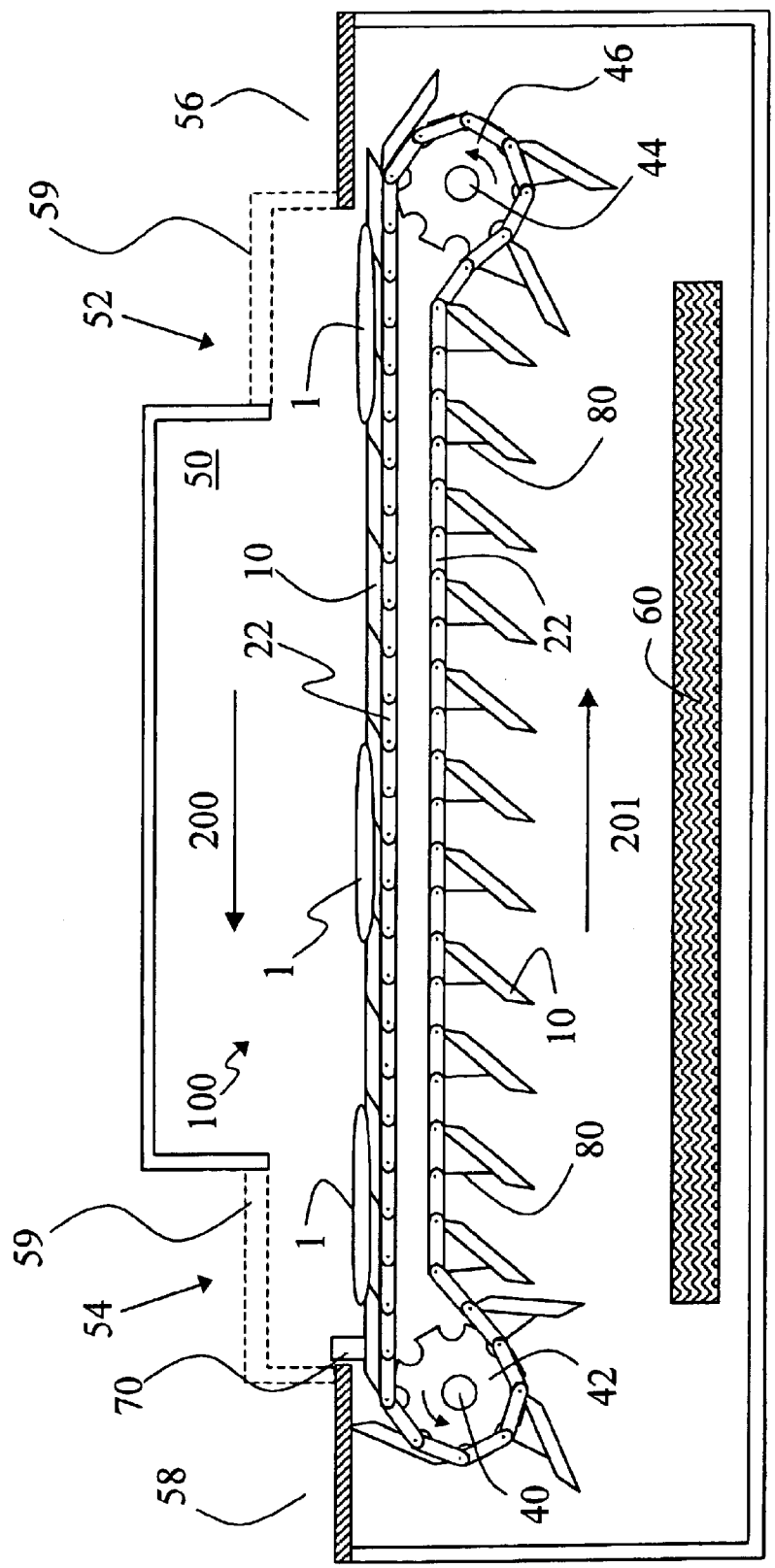
FIG. 8 is a schematic view of the apparatus within a cooking chamber offering entry and exit runways facilitating the loading and unloading of food substances according to one embodiment of the invention.
Figure 9:
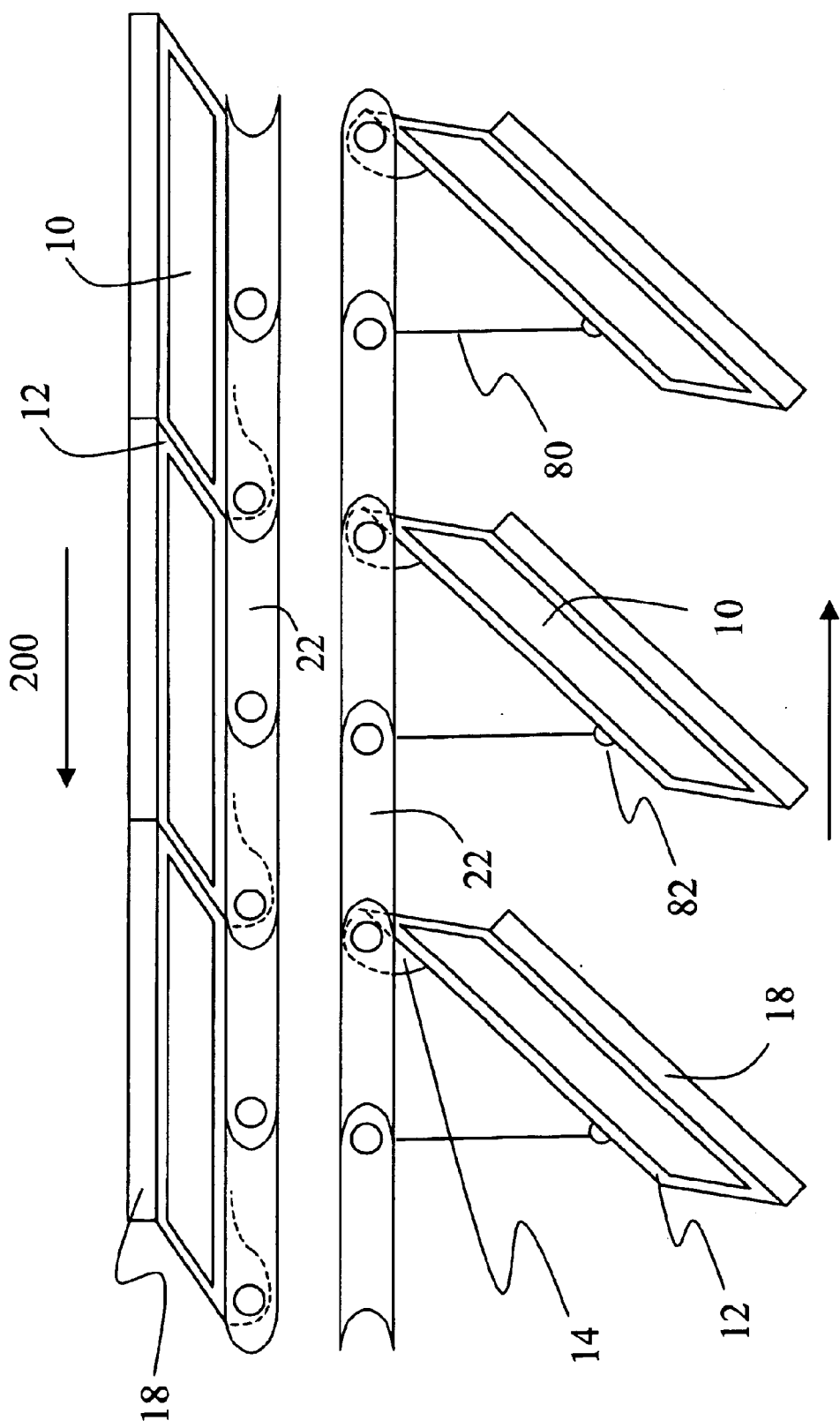
FIG. 9 is an enlarged view of the segment support cable mechanism according to one embodiment of the invention.

FIG. 6 is a plan view of the product conveyor assembly 100 within a cooking chamber 50 utilizing a heating mechanism 60 dedicated to minimizing temperature decreases of the hearth transporting food substances and to reheat hearth segments on the return portion of the cycle, according to one embodiment of the invention. The heating mechanism 60 can be any means of heating known to those of ordinary skill the art including fire, hot coals, infrared, electric, gas, convection and hot air impingement, among others, and is preferably thermostatically controlled. Passage of heat from the heating mechanism 60 to the upper hearth segments lying flush with one another in the effective baking zone 101 can be controlled based on the degree to which the segments are permitted to hang during the return portion of the cycle. In one embodiment, this degree may be controlled based on the attachment design of the hearth segments to the rotational support pins. In another embodiment, as shown in FIGS. 8 and 9, the hanging degree may be controlled by a segment support system. The dimensions of the conveyor will generally be governed by the dimensions of the cooking chamber 50 and, if applicable, the cooking chamber's entry and exit apertures.

During the transportation and baking stage of the food substances 1, the hearth segments 10 lie flush with one another on the conveyor frame 20 so as to form a relatively flat plane. Each hearth segment 10 interacts with the next adjacent hearth segment to facilitate turning around a radius while forming and maintaining a continuous, flat product support surface and preheated baking hearth. The radius about which hearth segments rotate is formed by the drive mechanism 40 that interacts with the drive chain or cable 22 of the conveyor frame 20 to drive the system.

In one embodiment, the hearth segments 10 are rotatably attached to the conveyor frame 20 and, at the end of the transportation and baking stage, the hearth segments rotate around the rotational support pins 26 and also around the axis defined by the drive mechanism 40. The hearth segments now enter a return and reheating stage of the baking cycle in which the hearth segments 10 hang from the conveyor frame 20 and are parallel to each other. In this configuration, the hearth segments 10 may be exposed to the heating mechanism 60 which can efficiently re-heat the hearth segments. The temperature of the hearth segments is brought back to an optimal cooking temperature during the return and reheating stage after losing heat to the food substance being cooked during the transportation and baking stage. At the conclusion of the return and reheating stage, the heated hearth segments 10 are again rotated so as to lie flush with one another on the conveyor frame 20 in preparation for the delivery of additional food substances 1 ready for transportation and baking.

Figure 7A:
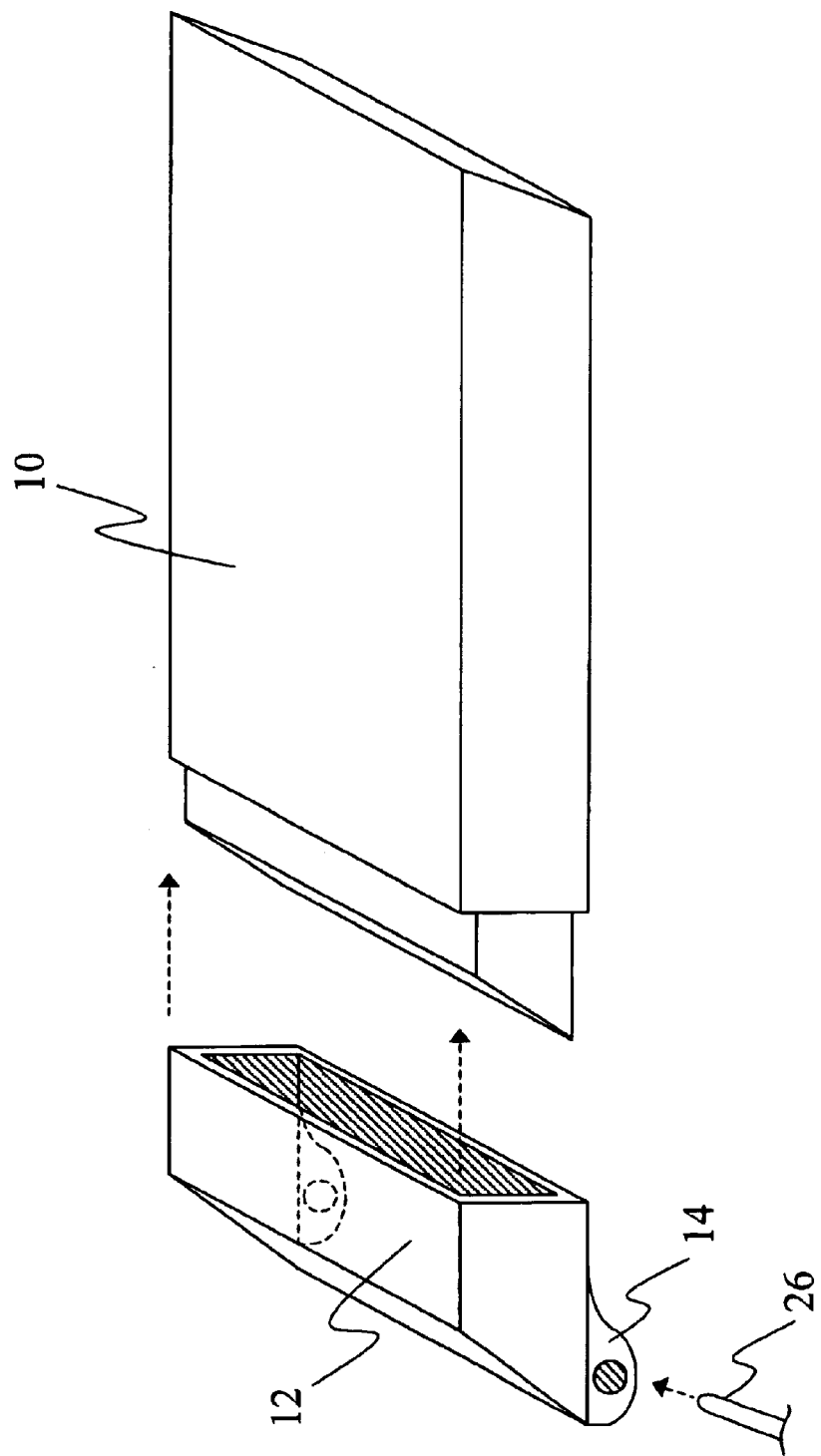
FIGS. 7A–7F are enlarged perspective views showing the coupling of hearth segments to the conveyor frame according to multiple embodiments of the invention.

FIGS. 7A–7F are enlarged perspective views of the attachment of a hearth segment 10 to the conveyor frame 20 according to multiple embodiments of the invention. The hearth segment 10 is attached so as to rotate with respect to the conveyor frame 20. In FIG. 7A, a coupling piece 12 is inserted over or otherwise attached to an end of the heath segment 10. The coupling piece 12 includes an attachment piece 14 for rotatably attaching the hearth segment 10 to the conveyor frame 20. As described, a rotational support pin 26 may be used that provides a rotational axis and gravitational support to the hearth segment. The rotational support pin or other mechanism 26 is slid through the attachment piece 14 and attached to the conveyor frame 20 so that the hearth segment 10 can rotate around the support pin 26. Alternatively, the rotational support pin 26 may be rotatably attached to the conveyor frame 20 to allow the hearth segment 10, coupling piece 12 and support pin 26 to rotate with respect to the conveyor frame 20. The drive chain or cable mechanism 22 of the conveyor frame 20 is attached to the support pin 26 in order to move the hearth segments. As previously mentioned, not all rotational support pins attached to the drive chain must provide both a rotational axis and gravitational support as some residing between those providing a rotational axis may provide only gravitational support. In alternate embodiments the drive chain or cable mechanism 22 may be attached to the hearth segment 10 or coupling piece 12 in order to move the hearth segments. In the embodiment shown, the ends of the hearth segments 10 and coupling pieces 12 are designed to partially overlap with other hearth segments and coupling pieces when lying in a flush position. Other designs are possible including no overlap and straight planar faces.

Figure 7B:
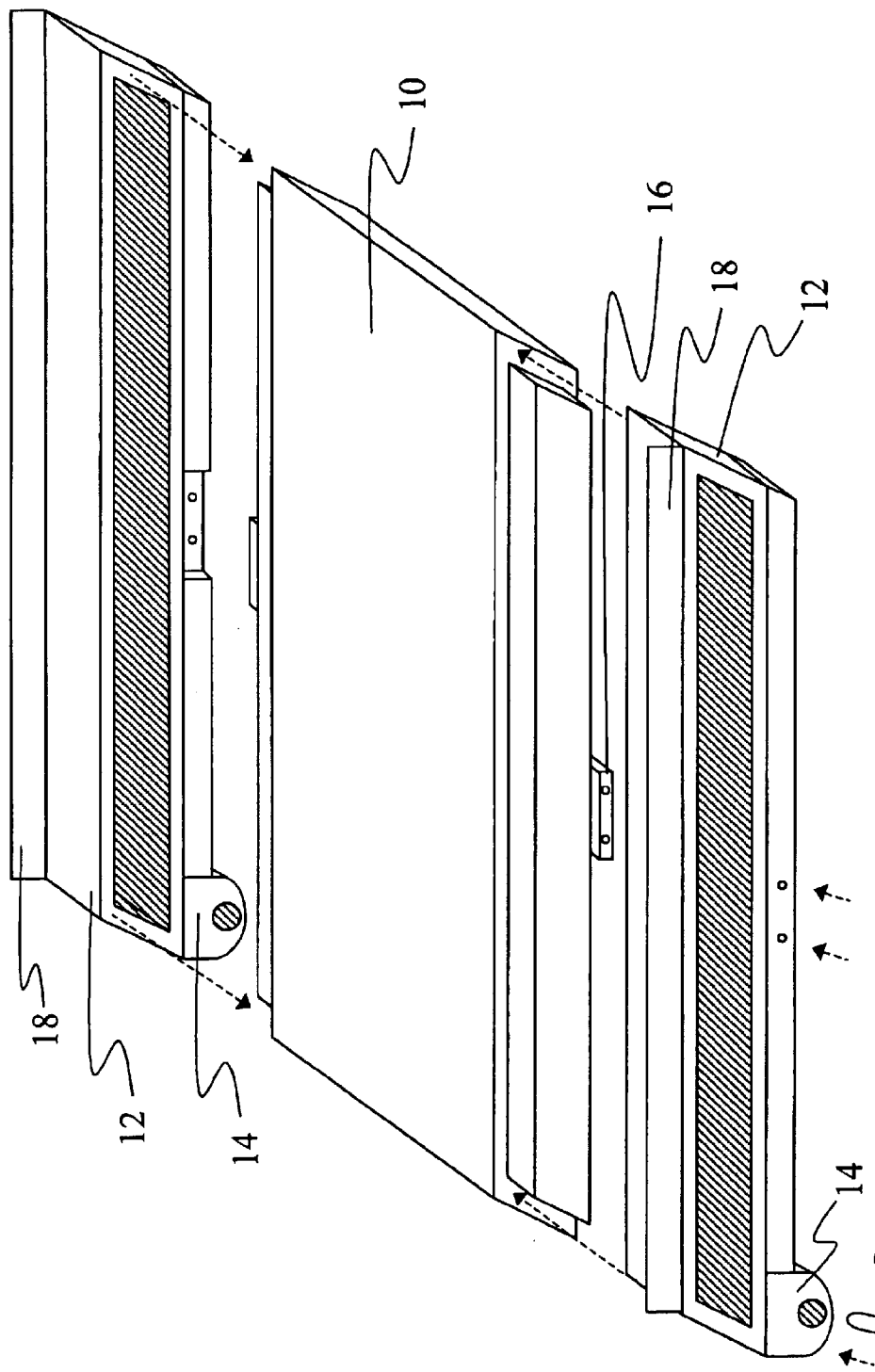

In an alternative embodiment, FIG. 7B shows coupling pieces 12 that are inserted over the longitudinal lengthwise sides of the hearth segment 10 in order to secure the hearth segment 10 to the conveyor frame 20. In another embodiment, the hearth couplings may have a raised outer edge 18 which protects and shields the drive chain from food substances and baking residuals. Further, the coupling piece 12 may include one or more metallic support members 16 running the length of each heart segment 10 between hearth coupling pieces 12 to improve the integrity, rigidity and stress tolerance of the hearth segments.

Figure 7C:
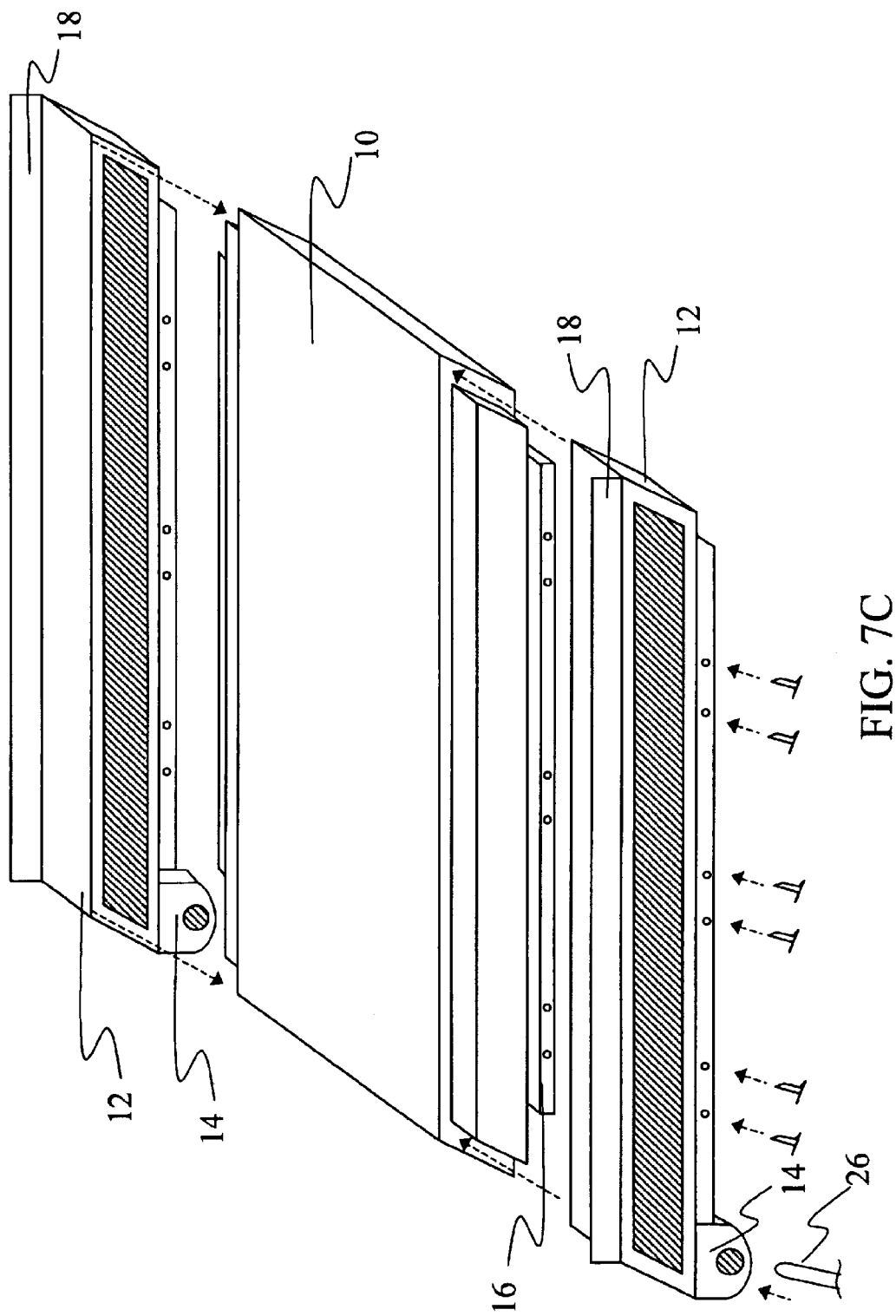

In another alternate embodiment, as shown in FIG. 7C, in lieu of multiple support members, a single metallic support member 16 may be of a larger size to provide greater structural support.

Figure 7D:
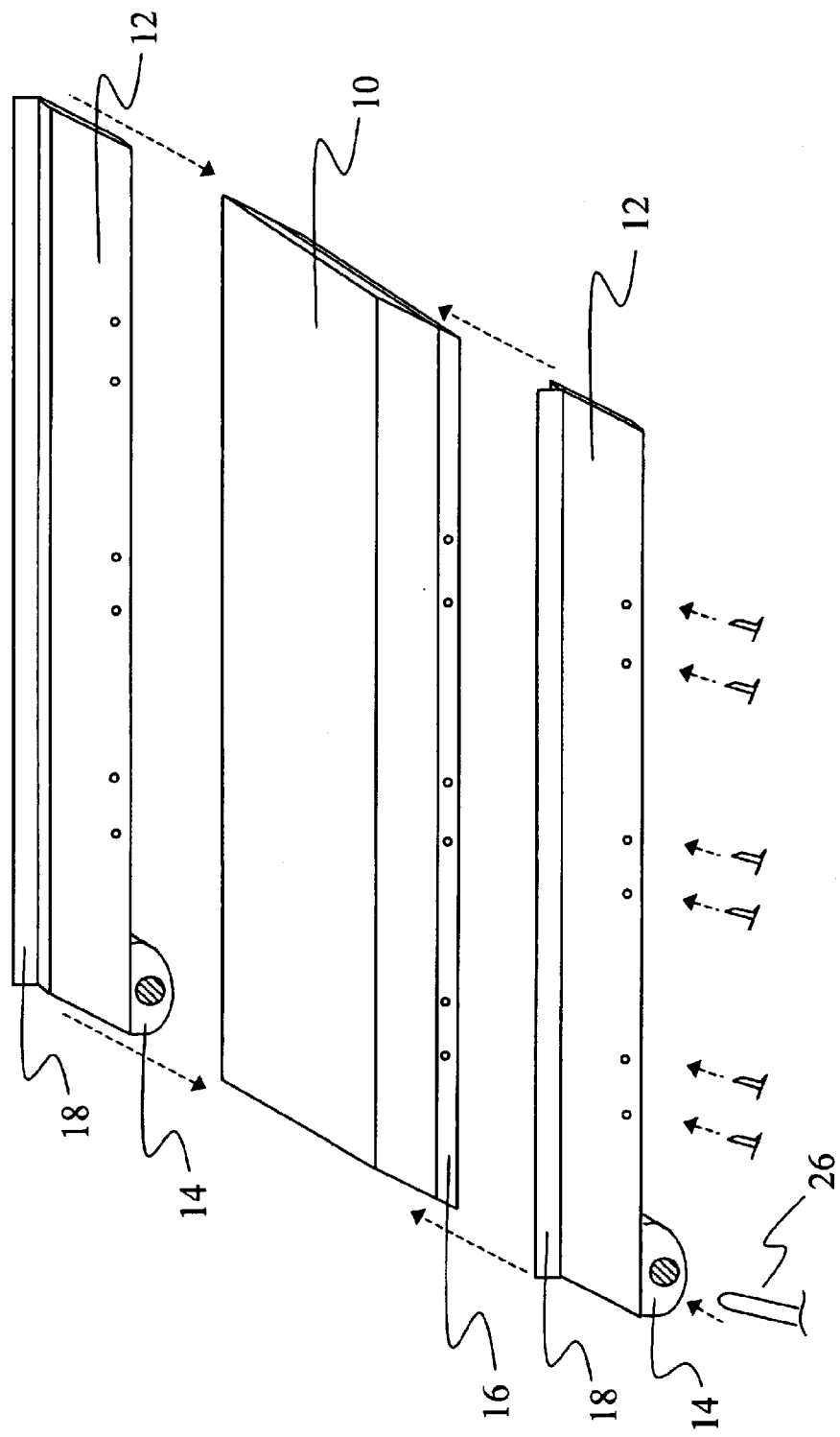
Figure 7E:
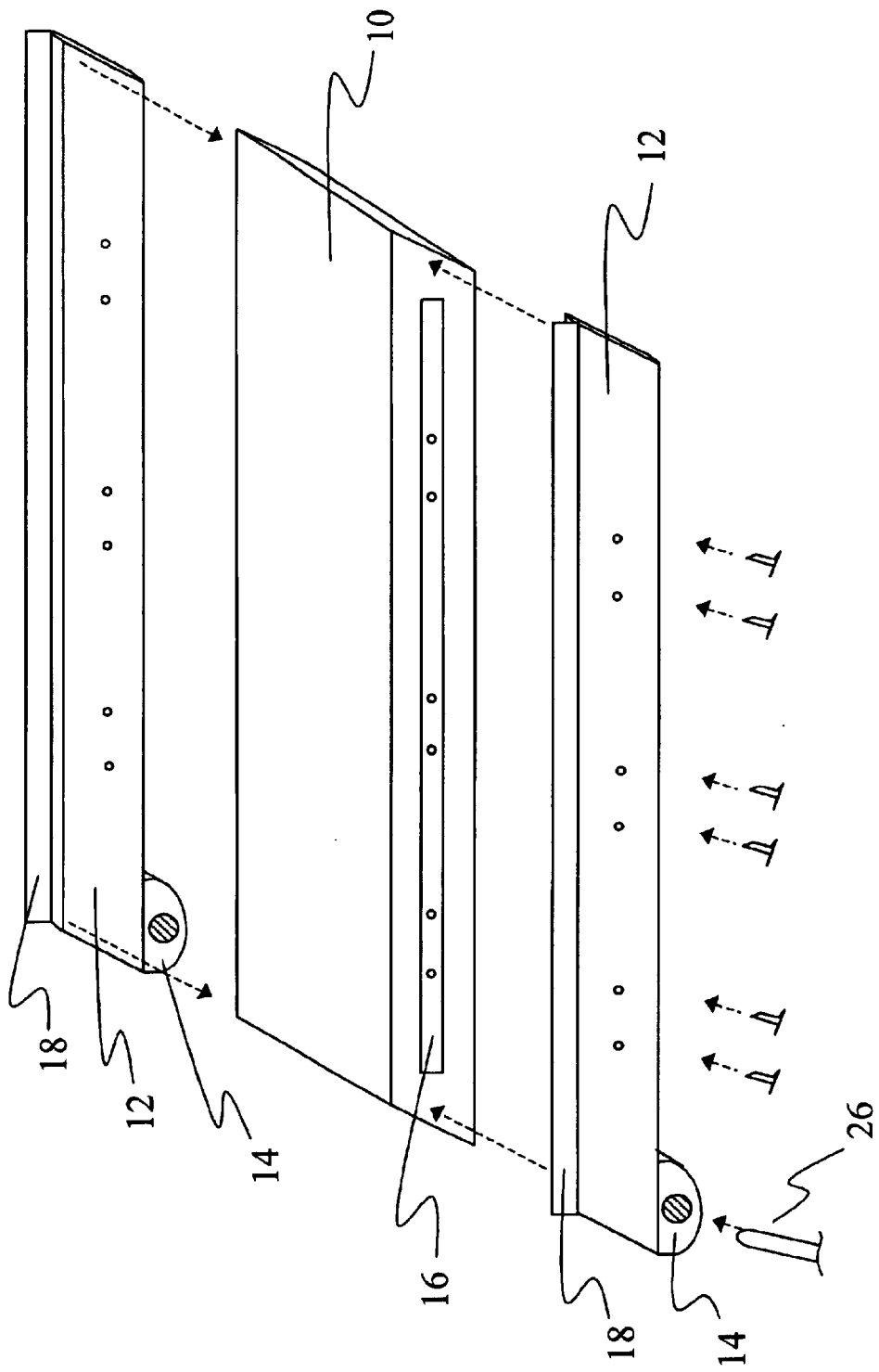
Figure 7F:
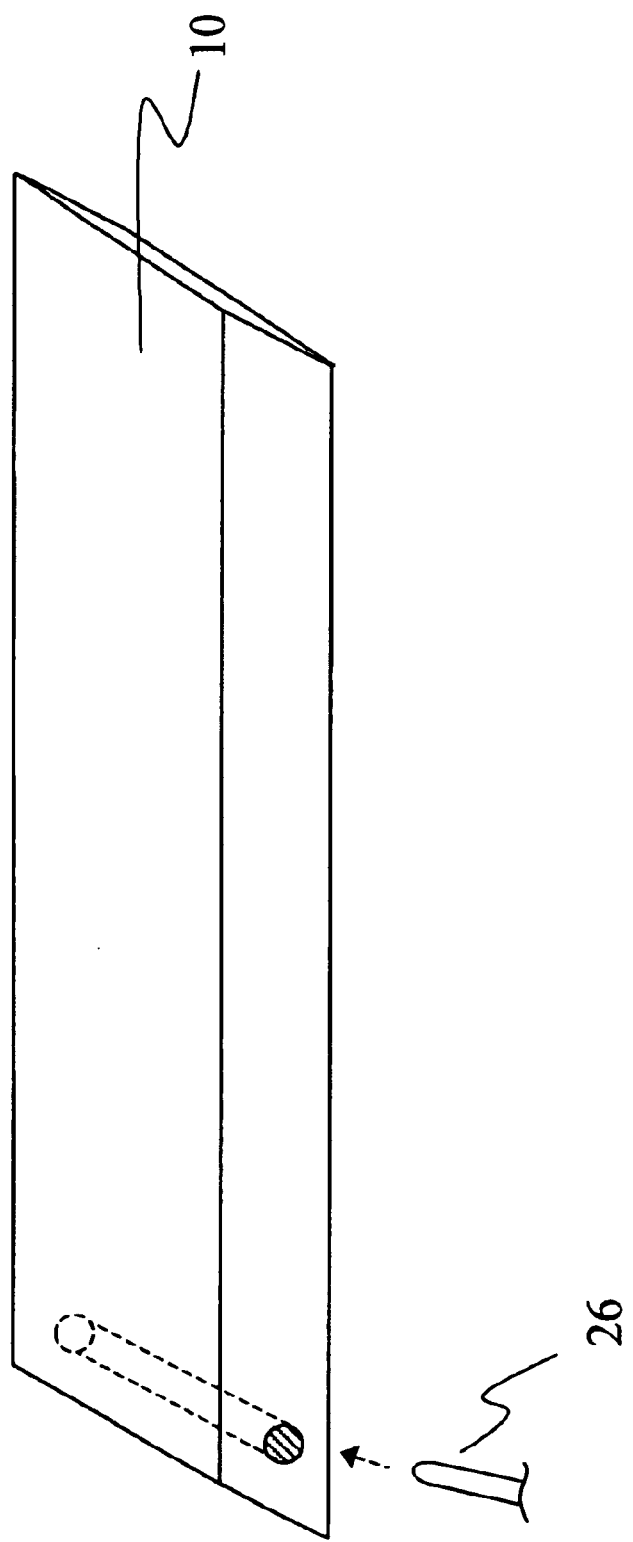

In other alternate embodiments, as shown in FIGS. 7D and 7E, the metallic support member may be incorporated in the design of the hearth segment itself. Shown in FIG. 7D is a metallic support member that is permanently affixed or bonded to the underside of the hearth material. Shown in FIG. 7E, the metallic support member may reside within the hearth segment itself partially or entirely surrounded or encased by the non-metallic hearth material. Such structural enhancements and others may be necessary as the dimensions of the conveyor assembly, and structural stress levels experienced by the hearth segments, are increased. In alternative embodiments, it is contemplated, as shown in FIG. 7F, that the attachment piece 14 to hold the support pin 26 could be incorporated as part of the hearth segment rather than a separate element; that is, a hole to receive the support pin 26 is bored through the hearth segment itself.

FIG. 8 is a plan view of the product conveyor assembly 100 within the cooking chamber 50 having entry 52 and exit 54 apertures or areas facilitating the loading and unloading of food substances according to one embodiment of the invention. A baker loads the food substances via the entry area 52 and removes substances from the exit area 54. The conveyor assembly 10 may be located partially within or, alternatively, entirely within the cooking chamber 50 where the substance to be baked is placed onto and removed from the conveyor through entry and exit areas 52, 54. It is contemplated that the cooking chamber 50 may be designed to expedite or automate the loading and unloading of food substances via entry 56 and exit 58 runways or platforms. In this embodiment, the entry 56 and exit 58 runways of the cooking chamber 50 could themselves be conveyors that operate separately from the main cooking conveyor assembly 100. The entry and exit areas 52, 54 and, if applicable, the entry and exit runways 56, 58, should be suitably designed to allow quick and easy loading and unloading of food substances by the baker. The dimensions of the conveyor will generally be governed by the dimensions of the cooking chamber 50 and, if applicable, the cooking chamber's entry and exit areas 52, 54.

Thermal insulated hoods 59, which may be raised or lowered to place and retrieve food substances on the conveyor, may be incorporated into the oven/cooking chamber 50 to maintain hearth temperature and increase the efficiency of the hearth conveyor oven assembly. Efficiency is increased when heated air is more effectively contained within the primary baking chamber as well as a housing which effectively surrounds the entire length of the conveyor. This eliminates the heat loss that would occur if the loading and unloading areas 52, 54 of the conveyor were continuously exposed to cooler ambient air outside of the oven or if loading and unloading food substances was performed via access doors to the primary baking chamber.

Food substances which have exited the primary baking chamber 50 or reached the end of the baking process may engage a drive motor halt assembly 70 which is located on the conveyor assembly 100 at the end of the upper portion transportation and baking stage. Upon engaging the drive motor halt assembly 70, the conveyor ceases its movement and an audible alert may be issued to notify the baker that a food substance has completed its baking cycle and may be removed from the conveyor. Such motor halt assembly 70 may include a timer control mechanism which records the amount of time the conveyor is motionless. Upon removal of the food substance, the timer control mechanism increases the conveyor speed for a period of time equal to the length of the halt. This ensures that other food substances baking on the conveyor experience the same consistent baking time and exposure despite the fact that the conveyor was halted during the baking process.

FIG. 8 further illustrates a conveyor assembly utilizing a segment support mechanism for controlling the degree to which the hearth segments hang during the return and reheating stage of the conveyor cycle. FIG. 9 is an enlarged view of this segment support mechanism. In one embodiment, segment support cables 80 are attached to the hearth segments 10 via a cable attachment 82. The length of the segment support cables 80 determines the degree of open area provided between adjacent hearth segments as they travel along the return and reheating portion of the conveyor cycle. In an embodiment that utilizes one heating mechanism 60 beneath the conveyor assembly 100, varying degrees of open area permits varying amounts of heat to pass through the open areas of the lower cycle portion and reach the hearth segments 10 on the upper cycle portion (in the transportation and baking stage). This heat passage allows the hearth segment temperature to be maintained as food substances absorb thermal energy from the hearth segments 10 during the transportation and baking stage. Other designs are contemplated to support the hearth segments during the return and reheating stage of the conveyor cycle. For example, rigid metallic support members may replace the support cables or additional channel guides may be affixed to the longitudinal side rails of the conveyor frame which support the lowest edges of the hearth segments, thereby controlling the degree to which the hearth segments hang during the return and reheating stage of the conveyor cycle.

Figure 10:
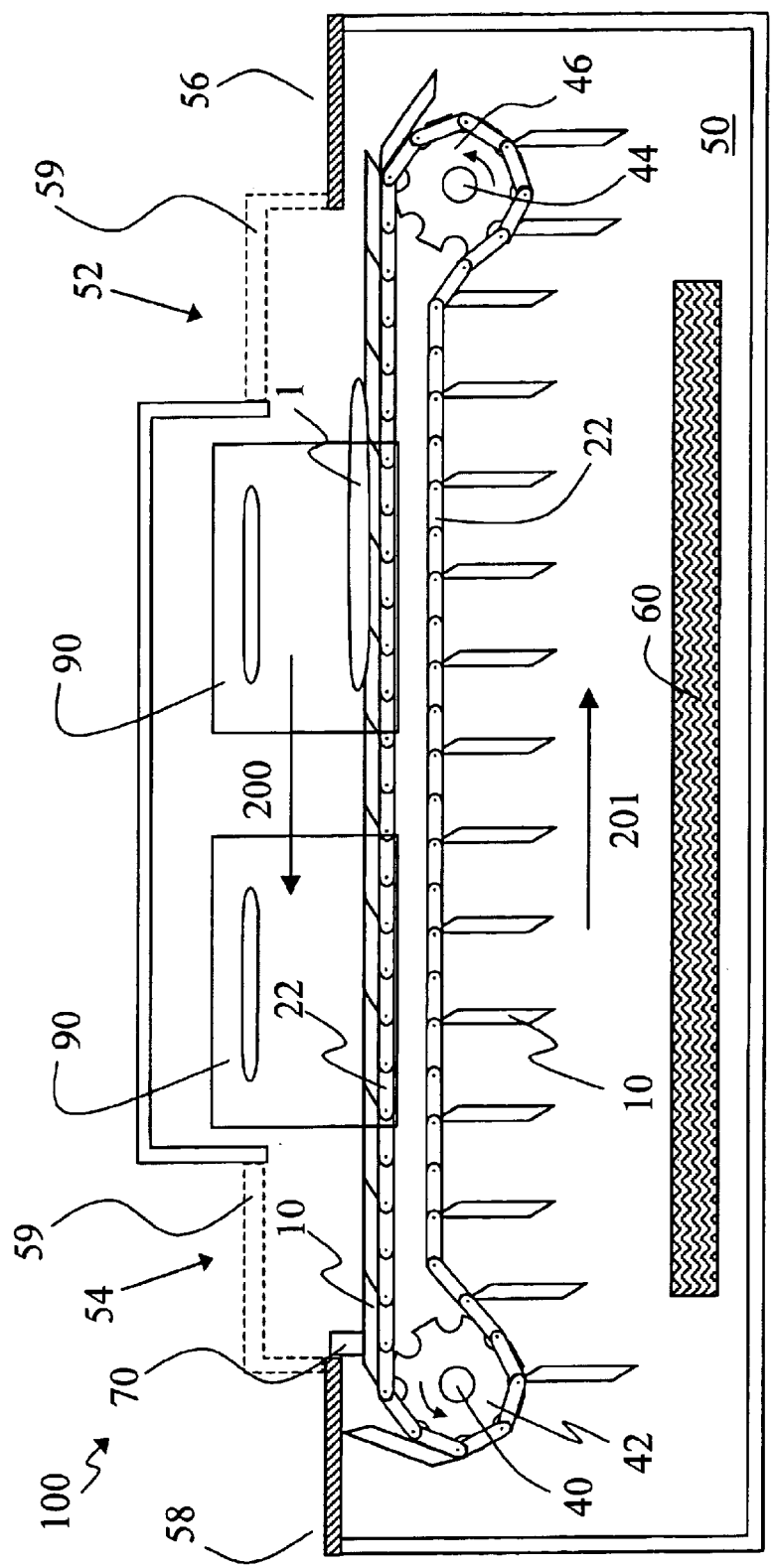
FIG. 10 is a schematic view of the conveyor assembly within a cooking chamber with front access doors facilitating the loading and unloading of food substances according to one embodiment of the invention.

FIG. 10 is a plan view of the product conveyor assembly 100 within the cooking chamber 50 having one or more front access doors 90 to facilitate the loading and unloading of food substances and the monitoring of the food substances according to one embodiment of the invention. The one or more front doors 90 provide access to the food substances throughout the baking process in the effective baking zone 101. Such access provides an additional degree of control and flexibility of the baker in simultaneously baking food substances that may require different baking times by removing or placing food substances at different places along the conveyor path of travel within the baking zone 101. The doors 90 may contain transparent windows to allow a baker to observe and monitor the food substances as they are baked.

Figure 11:
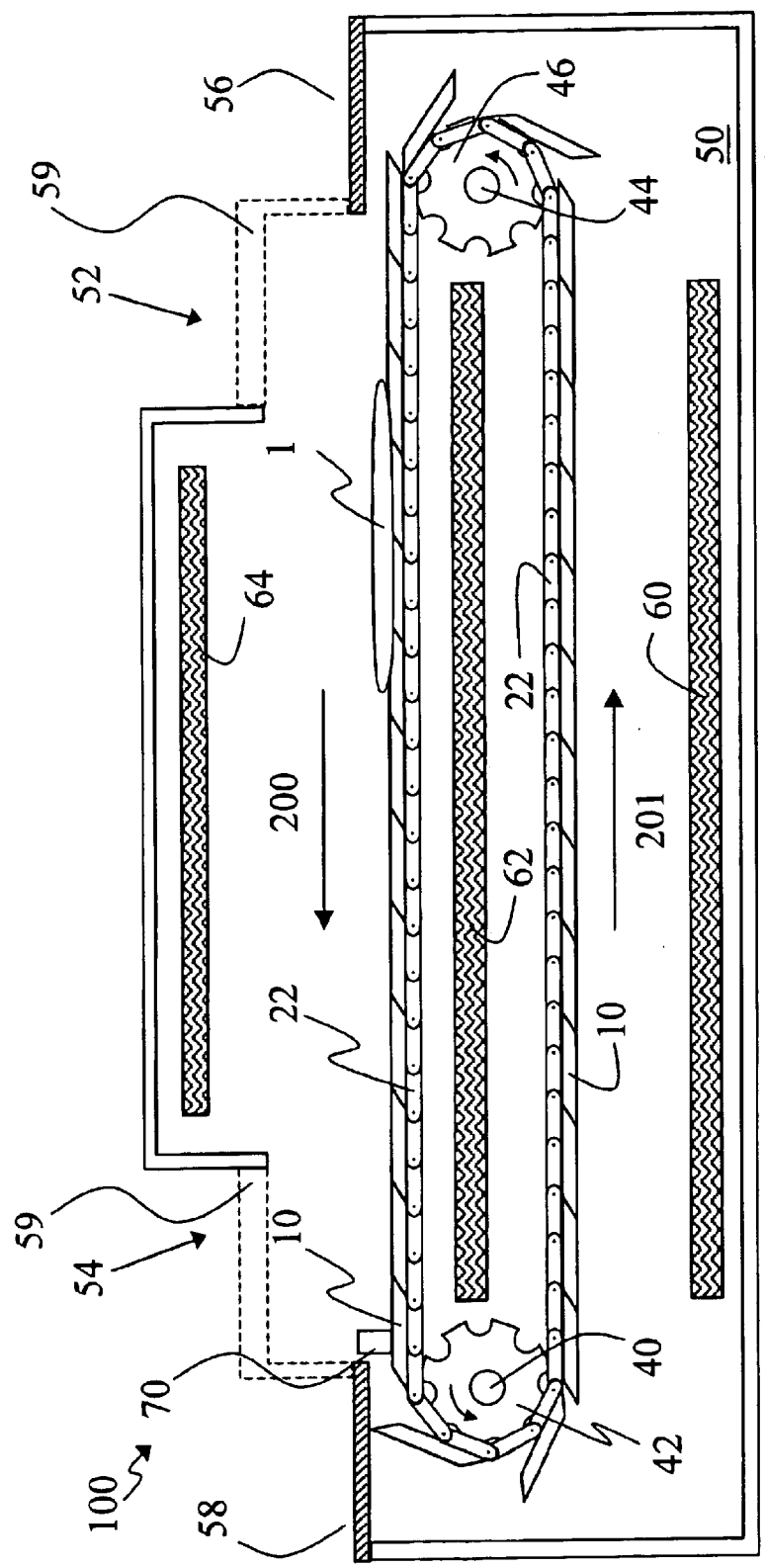
FIG. 11 is a schematic view of the conveyor assembly within a cooking chamber utilizing dual heating mechanisms according to one embodiment of the invention.

FIG. 11 is a plan view of the apparatus within a cooking chamber 50 which utilizes multiple heating mechanisms 60, 62 and 64. The heating mechanisms can be any means of heating known to those of ordinary skill the art including fire, hot coals, infrared, electric, gas, convection and hot air impingement, among others, and are preferably thermostatically controlled. One heating mechanism 60 is dedicated to reheating hearth segments on the return portion of the baking cycle. Another heating mechanism 62 is dedicated to minimizing temperature decreases of the hearth segments 10 when transporting food substances 1 as they are cooked. This design helps maintain the optimal cooking temperatures of the hearth segments at all times. It should be noted that in this embodiment, the hearth segments 10 do not need to hang parallel on the return and reheating stage of the baking cycle in order to allow heat to pass through to the upper portion of the conveyor frame. Instead, the second heating mechanism 62 maintains the temperature of the hearth segments during the transportation and baking stage, and the hearth segments may be designed so that adjacent hearth segments remain flush with one another in both the transportation and baking stage as well as the return and reheating stage.

In the embodiment shown, the side of the hearth segment 10 that was in contact with the food product 1 during the transportation and baking stage faces the heating mechanism 60 during the return and reheating stage. Yet another heating mechanism 64 may be dedicated to maintaining ambient air temperature within the cooking chamber and/or to provide more intense heat to the top of food substances. It is contemplated that one, or any combination of the above heating mechanisms, may be utilized within the same baking chamber dependent on heat intensity and heat delivery requirements. Convection and impingement technologies may be utilized to deliver heated air from a common heating mechanism to various areas of the baking chamber. The cited heating mechanisms and others can be placed in various positions within the cooking chamber or baking apparatus to maximize the efficiency of the system.

Figure 12:
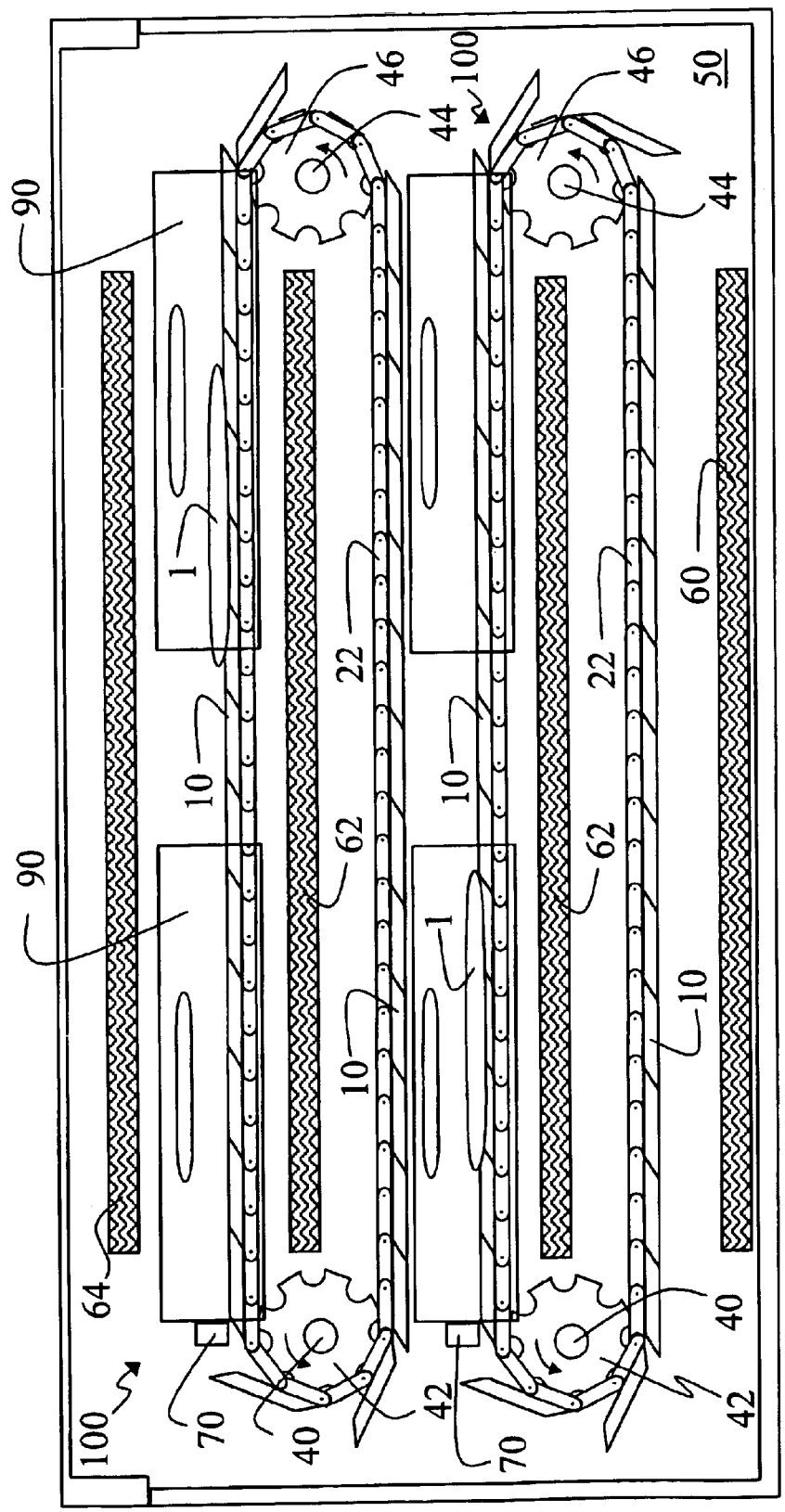
FIG. 12 is a schematic view of multiple conveyor assemblies within a cooking chamber utilizing multiple heating mechanisms according to one embodiment of the invention.

FIG. 12 is a plan view of two conveyor apparatus within a single cooking chamber 50 which utilizes multiple heating mechanisms 60, 62 and 64. It is contemplated that multiple conveyors may be used within the same cooking chamber and may be placed one above the other or, alternatively, may be placed beside each other. Although the hearth segments do not hang parallel providing open areas during the return and reheating stage of the baking cycle in the FIG. 12, in alternate embodiments they may. Furthermore, although the conveyors are shown residing entirely within the cooking chamber, it is possible for them to extend beyond the primary cooking chamber as detailed in previous embodiments providing entry and exit runways or platforms.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A conveyor apparatus, comprising:
   a conveyor frame;
   at least one hearth segment disposed on said conveyor frame;
   a drive mechanism attached to said conveyor frame; and
   a drive member engaging said drive mechanism and attached so as to move said at least one hearth segment on said conveyor frame;
   wherein said at least one hearth segment is rotatable with respect to said conveyor frame, and wherein, during a transportation and baking stage, said at least one hearth segment forms a flat baking surface and, during a return and reheating stage, said at least one hearth segment hangs from the conveyor frame such that one end of said at least one hearth segment is farther from the conveyor frame than the other end.

2. The conveyor apparatus of claim 1, wherein said at least one hearth segment is comprised of a material selected from the group consisting of: ceramic, brick, firebrick, stone, baked clay, transite, quarry tile, and other non-metallic baking hearth material suitable for baking food substances thereupon.

3. The conveyor apparatus of claim 1, wherein said at least one hearth segment is attached to the conveyor frame so as to rotate about an axis.

4. The conveyor apparatus of claim 1, wherein said at least one hearth segment is rotatably attached to the conveyor frame so as to lie flush with an adjacent hearth segment during said transportation and baking stage and hang parallel with an adjacent hearth segment during said return and reheating stage.

5. The conveyor apparatus of claim 1, wherein said drive mechanism is a drive axle having drive sprockets, and wherein said drive member is a drive chain that engages said drive sprockets.

6. The conveyor apparatus of claim 1, further comprising:
   a drive motor attached to said drive mechanism; and
   a controller for controlling speed of the drive motor in moving said at least one hearth segment along said conveyor frame.

7. The conveyor apparatus of claim 1, further comprising:
   a plurality of support rollers attached to said conveyor frame to provide gravitational support and a movement platform to said at least one heart segment.

8. The conveyor apparatus of claim 1, further comprising:
   a coupling piece attached to said at least one hearth segment, wherein said coupling piece is functionally attached to said conveyor frame.

9. A conveyor apparatus, comprising:
   a conveyor frame;
   at least one hearth segment disposed on said conveyor frame;
   a drive mechanism attached to said conveyor frame;
   a drive member engaging said drive mechanism and attached so as to move said at least one hearth segment on said conveyor frame; and
   a coupling piece attached to said at least one hearth segment, wherein said coupling piece is functionally attached to said conveyor frame, wherein said coupling piece is adapted to receive a support pin and wherein said at least one hearth segment and said coupling piece rotate around an axis defined by said support pin.

10. The conveyor apparatus of claim 1, further comprising:
    at least one segment support apparatus attached to said at least one hearth segment and said conveyor frame and controlling a hanging degree of said at least one hearth segment during said return and reheating stage.

11. The conveyor apparatus of claim 10, wherein said at least one segment support apparatus includes at least one of: a segment support cable, a rigid metallic support member, and additional channel guides affixed to the longitudinal side rails of the conveyor frame.

12. The conveyor apparatus of claim 1, further comprising:
    a plurality of channel guides disposed in parallel relation on said conveyor frame and adapted to receive and support said drive chain and said at least one hearth segment.

13. A conveyor oven, comprising:
    a cooking chamber;
    a conveyor frame positioned within said cooking chamber;
    at least one hearth segment disposed on said conveyor frame;
    a drive mechanism attached to said conveyor frame;

a drive member engaging said drive mechanism and attached so as to move said at least one hearth segment on said conveyor frame; and at least one heating mechanism positioned within said cooking chamber so as to heat said at least one hearth segment;

wherein said at least one hearth segment is rotatable with respect to said conveyor frame, and wherein, during a transportation and baking stage, said at least one hearth segment forms a flat baking surface and, during a return and reheating stage, said at least one hearth segment hangs from the conveyor frame such that one end of said at least one hearth segment is farther from the conveyor frame than the other end.

14. The conveyor oven of claim 13, wherein said at least one hearth segment is comprised of a material selected from the group consisting of: ceramic, brick, firebrick, stone, baked clay, transite, quarry tile, and other non-metallic baking hearth material suitable for baking food substances thereupon.

15. The conveyor oven of claim 13, wherein said at least one hearth segment is attached to the conveyor frame so as to rotate about an axis.

16. The conveyor oven of claim 13, wherein said at least one hearth segment is rotatably attached to the conveyor frame so as to lie flush with an adjacent hearth segment during said transportation and baking stage and hang parallel with an adjacent hearth segment during said return and reheating stage.

17. A conveyor oven, comprising:

a cooking chamber;

a conveyor frame positioned within said cooking chamber;

at least one hearth segment disposed on said conveyor frame;

a drive mechanism attached to said conveyor frame;

a drive member engaging said drive mechanism and attached so as to move said at least one hearth segment on said conveyor frame; and at least one heating mechanism positioned within said cooking chamber so as to heat said at least one hearth segment, wherein said at least one hearth segment is rotatably attached to the conveyor frame so as to lie flush with an adjacent hearth segment during a transportation and baking stage and hang parallel with an adjacent hearth segment during a return and reheating stage;

wherein said at least one heating mechanism includes first, second and third heating mechanisms, and wherein the first heating mechanism is positioned to reheat said hearth segments during said return and reheating stage, the second heating mechanism is positioned to heat said hearth segments during said transportation and baking stage to minimize heating fluctuations, and the third heating mechanism is positioned to heat ambient air within the cooking chamber.

18. The conveyor oven of claim 13, wherein said cooking chamber includes an entry area for loading uncooked food substances into said conveyor oven and an exit area for unloading cooked food substances from said conveyor oven.

19. The conveyor oven of claim 13, wherein said cooking chamber includes:

an entry area for loading an uncooked food substance onto said at least one hearth segment at a first position on said conveyor frame; and an exit area for unloading a cooked food substance from said at least one hearth segment at a second position on said conveyor frame.

20. The conveyor oven of claim 13, further comprising:

a drive mechanism halt assembly attached to said conveyor frame and connected to said drive mechanism for monitoring position of a food substance in said cooking chamber and controlling said drive mechanism.

21. The conveyor oven of claim 13, wherein said conveyor oven is adapted to allow for the stacking of multiple conveyor ovens on top of one another.

22. The conveyor oven of claim 13, wherein said cooking chamber is adapted to include at least two conveyor frames.

23. A method for cooking food substances, comprising the steps of:

positioning a conveyor frame;

disposing at least one hearth segment on said conveyor frame;

positioning an uncooked food substance on said at least one hearth segment; and driving movement of said at least one hearth segment along said conveyor frame in an endless cycle within a cooking chamber;

wherein said at least one hearth segment is rotatable with respect to said conveyor frame, and wherein, during a transportation and baking stage, said at least one hearth segment forms a flat baking surface and, during a return and reheating stage, said at least one hearth segment hangs from the conveyor frame such that one end of said at least one hearth segment is farther from the conveyor frame than the other end.

24. The method of claim 23, wherein said at least one hearth segment is comprised of a material selected from the group consisting of: ceramic, brick, firebrick, stone, baked clay, transite, quarry tile, and other non-metallic baking hearth material suitable for baking food substances thereupon.

25. The method of claim 23, wherein said at least one hearth segment is attached to the cycling conveyor frame so as to rotate about an axis.

26. The method of claim 23, wherein said at least one hearth segment is rotatably attached to the cycling conveyor frame so as to lie flush with an adjacent hearth segment during said transportation and baking stage and hang parallel with an adjacent hearth segment during said return and reheating stage.

27. The method of claim 23, wherein said at least one hearth segment is heated to a baking temperature during said return and reheating stage prior to receiving said uncooked food substance.

28. The conveyor apparatus of claim 1, wherein a cross-section of said at least one hearth segment is that of a parallelogram.

29. The conveyor oven of claim 13, wherein a cross-section of said at least one hearth segment is that of a parallelogram.

30. The method of claim 23, wherein a cross-section of said at least one hearth segment is that of a parallelogram.

31. A conveyor apparatus, comprising:

a conveyor frame;

at least one hearth segment disposed on said conveyor frame;

a drive mechanism attached to said conveyor frame;

a drive member engaging said drive mechanism and attached so as to move said at least one hearth segment on said conveyor frame; and a coupling piece attached to said at least one hearth segment, wherein said coupling piece includes a support pin and said conveyor frame is adapted to receive said support pin, and wherein said at least one hearth segment and said coupling piece rotate around an axis defined by said support pin.

* * * * *